(12) United States Patent
Nitta et al.

(10) Patent No.: US 11,016,011 B2
(45) Date of Patent: May 25, 2021

(54) BREAKING PREDICTION METHOD, PROGRAM, RECORDING MEDIUM, AND ARITHMETIC PROCESSING DEVICE

(71) Applicant: NIPPON STEEL & SUMITOMO METAL CORPORATION, Tokyo (JP)

(72) Inventors: Jun Nitta, Futtsu (JP); Shigeru Yonemura, Kisarazu (JP); Satoshi Shirakami, Yokohama (JP); Takashi Yasutomi, Kimitsu (JP)

(73) Assignee: NIPPON STEEL CORPORATION, Tokyo (JP)

( * ) Notice: Subject to any disclaimer, the term of this patent is extended or adjusted under 35 U.S.C. 154(b) by 716 days.

(21) Appl. No.: 15/573,613

(22) PCT Filed: May 18, 2016

(86) PCT No.: PCT/JP2016/064753
§ 371 (c)(1),
(2) Date: Nov. 13, 2017

(87) PCT Pub. No.: WO2016/186135
PCT Pub. Date: Nov. 24, 2016

(65) Prior Publication Data
US 2018/0136100 A1    May 17, 2018

(30) Foreign Application Priority Data

May 18, 2015 (JP) .............. JP2015-101311

(51) Int. Cl.
*G01N 3/28* (2006.01)
*G06F 30/00* (2020.01)
*G06N 7/00* (2006.01)

(52) U.S. Cl.
CPC .............. *G01N 3/28* (2013.01); *G06F 30/00* (2020.01); *G06N 7/005* (2013.01)

(58) Field of Classification Search
CPC ........... G01N 3/28; G06F 30/00; G06N 7/005
(Continued)

(56) References Cited

U.S. PATENT DOCUMENTS

2002/0177983 A1    11/2002    Maker
2009/0177417 A1*    7/2009    Yonemura ................ G01N 3/00
                                                                702/42
(Continued)

FOREIGN PATENT DOCUMENTS

CN    101379381 A    3/2009
CN    101788432 A    7/2010
(Continued)

OTHER PUBLICATIONS

Vaz et al, "Aspects of ductile fracture and adaptive mesh refinement in damaged elasto-plastic materials", 2001, International Journal for Numerical Methods in Engineerings, John Wiley & Sons (Year: 2001).*

(Continued)

*Primary Examiner* — Kamini S Shah
*Assistant Examiner* — Faraj Ayoub
(74) *Attorney, Agent, or Firm* — Birch; Stewart; Kolasch & Birch, LLP

(57) ABSTRACT

In a breaking prediction method of predicting a breaking portion of a component, which is obtained by forming a metal sheet, by using a finite element method, the breaking portion is easily and reliably extracted. This breaking prediction method includes a first step of performing forming analysis by using a finite element method in each of a case where the metal sheet is divided on the basis of a first mesh coarseness and a case where the metal sheet is divided on the basis of a second mesh coarseness which is coarser than the first mesh coarseness, a second step of obtaining a maximum main stress for each mesh in each of the case of the first (Continued)

mesh coarseness and the case of the second mesh coarseness, and a third step of obtaining a difference value between the maximum main stress in the case of the first mesh coarseness and the maximum main stress in the case of the second mesh coarseness in each portion of the component, and extracting a portion in the case of the first mesh coarseness, which corresponds to a portion in which the difference value is larger than a predetermined value, as the breaking portion.

8 Claims, 14 Drawing Sheets

(58) Field of Classification Search
USPC .............................................................. 703/2
See application file for complete search history.

(56) References Cited

U.S. PATENT DOCUMENTS

| 2009/0252641 A1* | 10/2009 | Hoshi | C22C 38/04 |
| | | | 420/118 |
| 2010/0121621 A1* | 5/2010 | Uenishi | G06F 30/23 |
| | | | 703/2 |
| 2013/0006543 A1 | 1/2013 | Hiwatashi et al. | |
| 2013/0332129 A1 | 12/2013 | Xia et al. | |

FOREIGN PATENT DOCUMENTS

| CN | 102822659 A | 12/2012 |
| CN | 103488811 A | 1/2014 |
| EP | 2136197 A1 | 12/2009 |
| JP | 8-339396 A | 12/1996 |
| JP | 11-191098 A | 7/1999 |
| JP | 2000-107818 A | 4/2000 |
| JP | 2002-60898 A | 2/2002 |
| JP | 2005-17215 A | 1/2005 |
| JP | 2005-177837 A | 7/2005 |
| JP | 2006-257506 A | 9/2006 |
| JP | 4865036 B2 | 2/2012 |
| RU | 2324918 C1 | 5/2008 |
| RU | 2445601 C2 | 3/2012 |
| TW | 200900981 A | 1/2009 |
| WO | WO 2008/133092 A1 | 11/2008 |
| WO | WO 2014/208697 A1 | 12/2014 |

OTHER PUBLICATIONS

Korean Notice of Allowance, dated Nov. 27, 2018, for Korean Application No. 10-2017-7032614, with an English translation.
Russian Office Action dated Aug. 14, 2018, issued in Russian Counterpart Application No. 2017139510.
Extended European Search Report, dated Oct. 2, 2018, for corresponding European Application No. 16796528.4.
Sheng et al., "FEM-based Progressive Drawing Process Design," Int J Adv Manuf Technol, Springer, Berlin, DE, vol. 36, No. 3-4, 2008 (Published online Nov. 9, 2006), pp. 226-236, XP019583720.
Chinese Office Action and Search Report dated Jul. 22, 2019, for counterpart Chinese Application No. 201680028089.X, with English translation.
International Search Report for PCT/JP2016/064753 dated Jul. 5, 2016.
Kahn et al., "Continuum Theory of Plasticity", Chapter 2 Yield Criteria, 4.1 Stress State and Stress Space, pp. 83-85, total 4 pages.
Kreyszig, "Higher mathematics for engineers 2, Linear algebra and vector analysis (original document 5th edition)", 2.13 eigenvalue, Eigenvector, pp. 99-104, total 9 pages.
Office Action for TW 105115333 dated Jan. 12, 2017.
Written Opinion of the International Searching Authority for PCT/JP2016/064753 (PCT/ISA/237) dated Jul. 5,2016.

* cited by examiner

BREAKING PREDICTION METHOD, PROGRAM, RECORDING MEDIUM, AND ARITHMETIC PROCESSING DEVICE

TECHNICAL FIELD OF THE INVENTION

The present invention relates to a breaking prediction method, a program, a recording medium, and an arithmetic processing device for predicting a breaking portion when forming analysis is performed by a finite element method.

The application is according to Japanese Patent Application No. 2015-101311 filed on May 18, 2015, the content of which is incorporated herein by reference.

RELATED ART

In recent years, the development of a car body structure capable of having a reduced influence on a crew member at the time of the collision of an automobile has become an urgent problem in the automobile industry. On the other hand, a reduction in the weight of a vehicle body for improving fuel consumption has been also an important issue. In order to solve these problems, the application of a high-strength steel sheet has been examined, particularly, in a steel material which has a higher strength. Such application of a high-strength material is not limited to the automobile industry from the viewpoint of achieving both an increase in strength and a reduction in weight, and has also been examined in many industries such as industries dealing with various vehicles such as railway vehicles, ships, and aircraft, general machinery, and household electric appliances. However, an increase in strength generally results in a deterioration of formability. For this reason, in order to expand the application of a high-strength steel sheet, it is important to improve formability, particularly, stretch frangeability. That is, it is preferable to avoid the occurrence of breaking in forming a high-strength steel sheet.

In order to solve such a problem, a material having excellent stretch frangeability has been developed. For example, Patent Document 1 discloses a material having improved stretch frangeability by the control of microscopic texture such as ferrite and bainite. In addition, Patent Document 2 discloses an aluminum alloy sheet having excellent stretch frangeability which is obtained by specifying plastic anisotropy and uniform elongation in a tensile test in a specific direction.

However, whether or not forming can be performed by a real component is not determined by only material characteristics, and is complicatedly influenced by the shape of a die, lubrication conditions, forming conditions, and the like. Therefore, in order to utilize excellent material characteristics, it is necessary to appropriately set such complicate factors. A numerical value analysis technique is applied for such a purpose.

Patent Document 3 discloses a method of predicting a forming failure during forming using a finite element method. Accordingly, analysis is performed using the finite element method, and the occurrence of the forming failure is determined using data on the strain and stress of an element to be noticed. However, in a case where such a method is used, it is necessary to divide an element into an appropriate size in accordance with an analysis target. In a case where analysis is performed through inappropriate element division, a prediction result leads to overestimation or underestimation, which results in a case not corresponding to actuality.

PRIOR ART DOCUMENT

Patent Document

[Patent Document 1] Japanese Unexamined Patent Application, First Publication No. 2002-60898
[Patent Document 2] Japanese Unexamined Patent Application, First Publication No. 2006-257506
[Patent Document 3] Japanese Unexamined Patent Application, First Publication No. H8-339396
[Patent Document 4] Japanese Patent Publication No. 4865036

Non-Patent Document

[Non-Patent Document 1] "Continuum Theory of Plasticity", written in collaboration by Akhtar S. Kahn and Sujian Huang, Chapter 2 YIELD CRITERIA, 4.1 STRESS STATE AND STRESS SPACE, page 83 to page 85.
[Non-Patent Document 2] "Advanced Engineering Mathematics 2, linear algebra and vector analysis (the fifth edition of the original)", written by E. Kreyszig, 2.13 eigenvalue, eigenvector, page 99 to page 104.

DISCLOSURE OF THE INVENTION

Problems to be Solved by the Invention

In Patent Document 4, unlike the related art, two examples of finite element analysis, which differ in the size of element division, are quantitatively compared with each other in terms of the distribution of a ratio of a reduction in a sheet thickness or a maximum main strain. Thereby, the accuracy of prediction of a stretch flange crack portion is successfully increased. A technique disclosed in Patent Document 4 enables the prediction of a stretch flange crack portion without necessarily improving the accuracy of calculation of finite element analysis, and thus there is a great advantage in that the prediction can be performed in a short period of time and at low costs without limiting finite element analysis software.

However, in Patent Document 4, a geometric deformation amount, such as the distribution of a ratio of a reduction in a sheet thickness or a maximum main strain, is set to be an evaluation index with respect to the specification of the stretch flange crack portion. When a steel sheet which is a component to be analyzed is a steel sheet material of which even a large strain region can be formed because of its relatively high deformability, it is possible to predict and specify an elongation flange portion without any problem. However, in a case where a steel sheet which is a component to be analyzed is a high tensile strength steel sheet or a metal sheet which is hard to form, a difference in the distribution of a maximum main strain between two different types of element division is decreased in a result of the finite element analysis, which results in a tendency for the accuracy of detection of a stretch flange crack portion to be decreased. Therefore, in the application of the prediction technique for a material hard to form in which breaking may occur in a low strain region such as a high tensile strength steel sheet, the prediction of the stretch flange crack portion is not sufficient.

The invention is contrived in view of the above-described problem, and an object thereof is to provide a breaking prediction method, a program, a recording medium, and an arithmetic processing device for easily and reliably extracting a breaking portion in a method of predicting the breaking of a component, obtained by forming a metal sheet, by using a finite element method.

Means for Solving the Problem

The invention adopts the following aspects in order to accomplish such an object by solving the above-described problem.

(1) That is, a breaking prediction method according to an aspect of the invention is a breaking prediction method of predicting a breaking portion of a component obtained by forming a metal sheet, and includes a first step of performing forming analysis by using a finite element method in each of a case where the metal sheet is divided on the basis of a first mesh coarseness and a case where the metal sheet is divided on the basis of a second mesh coarseness which is coarser than the first mesh coarseness, a second step of obtaining a maximum main stress for each mesh in each of the case of the first mesh coarseness and the case of the second mesh coarseness, and a third step of obtaining a difference value between the maximum main stress in the case of the first mesh coarseness and the maximum main stress in the case of the second mesh coarseness in each portion of the component, and extracting a portion in the case of the first mesh coarseness, which corresponds to a portion in which the difference value is larger than a predetermined value, as the breaking portion.

In the aspect according to (1), two types of mesh coarsenesses of the first mesh coarseness and the second mesh coarseness coarser than the first mesh coarseness are used. In the finite element method, the maximum main stress within each mesh is averaged and output. Therefore, in a case where a stress concentration portion is present within a certain mesh, the maximum main stress in the case of the finer first mesh coarseness is less influenced by averaging, and thus becomes larger than the maximum main stress in the case of the coarser second mesh coarseness. Therefore, in each portion, a difference value in the maximum main stress between the two types of mesh coarsenesses is obtained. In a case where the difference value is larger than the predetermined value, the portion can be regarded as a stress concentration portion. As stress is more concentrated, the degree of risk of breaking becomes higher, and thus it is possible to predict the degree of risk of the occurrence of breaking in accordance with the magnitude of the difference value in the maximum main stress.

In addition, in a case where only one type of mesh coarseness of the related art is used, the influence of averaging is increased in a case where the mesh coarseness is coarse, and the contribution of a portion having stress concentrated thereon is buried in an average value. For this reason, an extremely small mesh coarseness has to be set in order to extract a portion which has stress concentrated thereon and has a high degree of risk of breaking. On the other hand, in this aspect, a breaking portion is extracted through quantitative comparison between the maximum main stress in the case of the first mesh coarseness and the maximum main stress in the case of the second mesh coarseness. Accordingly, a mesh coarseness allowing both the maximum main stresses to be compared with each other is sufficient, and it is not essential to set the first mesh coarseness to be an extremely small mesh coarseness as in the related art. Therefore, it is possible to perform forming analysis in a short period of time and at low costs.

In addition, in this aspect, the maximum main stress is used as an index. In a case of a metal sheet, such as a high-strength steel sheet, which has a high tensile strength and small elongation, stress greatly varies even when the amount of deformation is small. For this reason, since the amount of deformation itself is small even when a geometric deformation amount such as a ratio of a reduction in a sheet thickness or a maximum main strain is set to be an index, a difference in the value of an index between different mesh coarsenesses becomes unclear, and thus it is difficult to predict a breaking portion. On the other hand, the maximum main stress which is a dynamic variation amount is set to be an index, and thus a difference in the value of the index becomes clear, and thus it is possible to easily and reliably predict a breaking portion even with respect to a metal sheet having a high tensile strength and small elongation.

(2) The breaking prediction method according to (1) may further include a 0-th step of determining the first mesh coarseness and the second mesh coarseness on the basis of an n value indicating a work hardening property of the metal sheet.

In this case, the first mesh coarseness and the second mesh coarseness are optimally set on the basis of the n value. Therefore, it is possible to obtain excellent accuracy of prediction without reducing the accuracy of prediction by an excessively coarse mesh coarseness, and contrarily, without increasing the calculation time by using an unnecessarily fine mesh coarseness.

(3) In breaking prediction method according to the breaking prediction method according to (1) or (2), in a case where the breaking portion is not extracted in the third step, the first step to the third step may be performed again after resetting at least the first mesh coarseness, out of the first mesh coarseness and the second mesh coarseness, to a coarseness coarser than at least the first mesh coarseness or resetting the predetermined value to a smaller value, or a combination thereof.

In this case, at least the first mesh coarseness is reset to be a finer coarseness so that the influence of averaging of the maximum main stress in the mesh is reduced, that is, a portion having stress concentrated thereon is actualized. Thereby, a larger difference value between the maximum stress based on the first mesh coarseness and the maximum main stress based on the second mesh coarseness is obtained, and thus it is possible to more reliably predict a breaking portion.

On the other hand, in a case where the predetermined value is reset to be a smaller value, for example, a portion in which a difference value in the maximum main stress is not so large can be predicted as a portion having a risk of the occurrence of breaking.

(4) In the breaking prediction method according to any one of (1) to (3), an adaptive mesh may be used when division based on the first mesh coarseness is performed.

In this case, analysis is performed with a coarse mesh during the start of forming, and a mesh is finely divided again only in a portion having a great deformation or stress variation in association with the progress of a forming process, and thus it is possible to reduce an analysis time.

In addition, a mesh is refined in a portion having a great deformation or stress variation, that is, a portion having a high risk of breaking, and thus it is possible to improve the accuracy of prediction.

(5) In the breaking prediction method according to any one of (1) to (4), the forming analysis in the first step may be terminated in the middle of forming of the component.

In this case, so-called midway stop evaluation for stopping the forming analysis in the middle of forming of the component is performed. The midway stop evaluation is performed to allow the difference value in maximum main stress to be evaluated before a stress state becomes close to a tensile strength or before a problem occurs in the forming analysis due to excessive deformation as the forming progresses.

(6) In the breaking prediction method according to any one of (1) to (5), the second step may further include obtaining a shape index value, which is at least one of a maximum main strain and a ratio of a reduction in a sheet thickness, for each mesh with respect to a case of division based on the first mesh coarseness and a case of division based on the second mesh coarseness, the third step may further include obtaining a difference value between the shape index value in the case of the first mesh coarseness and the shape index value in the case of the second mesh coarseness in each portion of the component, and a portion in the case of the first mesh coarseness, which corresponds to a portion satisfying the difference value in the shape index value being larger than a predetermined value or the difference value in the maximum main stress being larger than the predetermined value, or a combination thereof, may be extracted as the breaking portion.

In this case, in addition to prediction using the maximum main stress, prediction using at least one of the maximum main strain and the ratio of a reduction in a sheet thickness is also performed. It is possible to improve the reliability of prediction by combining a plurality of predictions with each other.

In addition, in contrast to a metal sheet having a high tensile strength and small elongation, in a metal sheet having a low tensile strength and large elongation, the amount of deformation is large, and thus it becomes desirable to set a geometric deformation amount, such as a ratio of a reduction in a sheet thickness or a maximum main strain, to be an index. In addition, in a metal sheet having a middle tensile strength and elongation between the metal sheet having a high tensile strength and small elongation and the metal sheet having a low tensile strength and large elongation, it is desirable to use both prediction using a maximum main stress and prediction using at least one of a maximum main strain and a ratio of a reduction in a sheet thickness, without using any one of the predictions. That is, it is possible to extract a breaking portion with an excellent accuracy of prediction with respect to various types of metal sheets, such as not only a metal sheet (for example, a high tensile strength steel sheet) which has a high strength and small elongation and a metal sheet (for example, a soft steel sheet) which is particularly suitable for prediction using a maximum main strain or a ratio of a reduction in a sheet thickness but also a metal sheet which has a middle strength therebetween, by combining a plurality of predictions with each other.

(7) A breaking prediction method according to another aspect of the invention is a breaking prediction method of predicting a breaking portion of a component obtained by forming a metal sheet, and includes a first step of dividing the metal sheet into meshes on the basis of a predetermined mesh coarseness to perform forming analysis by using a finite element method, a second step of obtaining a maximum main stress for each mesh, a third step of obtaining a maximum main stress for each coupled mesh obtained by coupling two or more meshes adjacent to each other, and a fourth step of obtaining a difference value between the maximum main stress obtained in the second step and the maximum main stress obtained in the third step for each portion of the component, and extracting a portion in the second step, which corresponds to a portion in which the difference value is larger than a predetermined value, as the breaking portion.

In the aspect according to (7), maximum main stresses before and after the coupling of meshes are compared with each other, rather than comparing maximum main stresses using the two types of mesh coarsenesses according to (1) with each other, and thus it is possible to easily and reliably predict a breaking portion, similar to the aspect according to (1).

In addition, forming analysis is basically performed only once, and thus it is possible to perform the forming analysis in a shorter period of time and at lower calculation costs.

(8) In the breaking prediction method according to (7), an adaptive mesh may be used when division based on the predetermined mesh coarseness is performed.

In this case, similarly to the aspect according to (4), it is possible to reduce the analysis time and to improve the accuracy of prediction by using the adaptive mesh.

(9) In the breaking prediction method according to (7) or (8), the forming analysis in the first step may be terminated in the middle of forming of the component.

In this case, similarly to the aspect according to (5), the midway stop evaluation is performed, and thus it is possible to evaluate a difference value in maximum main stress before a stress state becomes closer to a tensile strength or before a problem occurs in the forming analysis.

(10) In the breaking prediction method according to any one of (7) to (9), the second step may further include obtaining a shape index value, which is at least one of a maximum main strain and ratio of a reduction in a sheet thickness, for each mesh, the third step may further include obtaining the shape index value for each coupled mesh, and the fourth step may further include obtaining a difference value between the shape index value obtained in the second step and the shape index value obtained in the third step for each portion of the component, and extracting a portion in the second step, which corresponds to a portion satisfying the difference value in the shape index value being larger than a predetermined value or the difference value in the maximum main stress being larger than the predetermined value, or a combination thereof, as the breaking portion.

In this case, similarly to the aspect according to (6), in addition to prediction using the maximum main stress, prediction using at least one of the maximum main strain and the ratio of a reduction in a sheet thickness is also performed, and thus it is possible to obtain excellent accuracy of prediction with respect to various types of metal sheets.

(11) In the breaking prediction method according to any one of (1) to (10), an occurrence portion of a stretch flange crack may be predicted as the breaking portion. In this case, it is possible to predict the occurrence of a stretch flange crack particularly resulting in breaking.

(12) In the breaking prediction method according to any one of (1) to (11), the breaking portion at an end portion of the component may be extracted.

In this case, it is possible to predict breaking at an end portion of the component having a high risk of the occurrence of breaking.

(13) In the breaking prediction method according to any one of (1) to (12), the metal sheet may be a steel sheet having a tensile strength of equal to or greater than 980 MPa.

In this case, it is possible to predict breaking with respect to a steel sheet having a tensile strength of equal to or greater than 980 MPa which is a metal sheet which is hard to form.

(14) A program according to still another aspect of the invention executes the breaking prediction method according to any one of (1) to (13).

(15) The program according to (14) is recorded in a computer-readable recording medium according to the aspect of the invention.

(16) An arithmetic processing device according to still another aspect of the invention executes the program according to (14).

EMBODIMENTS OF THE INVENTION

Figure 1A:
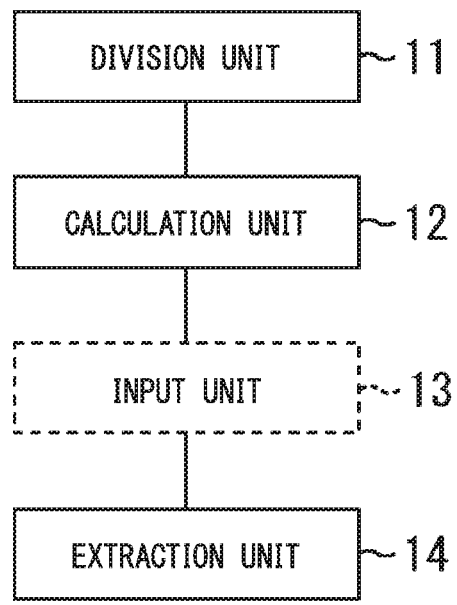
FIG. 1A is a diagram showing a schematic configuration of an arithmetic processing device of the invention.

The inventor has conceived of a new breaking prediction method using the fact that a main stress is averaged depending on a mesh coarseness in analysis based on a finite element method, focusing on a stress gradient is large in the vicinity of a breaking portion of a component obtained by forming a metal sheet which is a component to be analyzed.

In the invention, analysis is performed on a portion having a stress gradient by using two types of meshes (elements) (here, for convenience of description, the coarseness of a finer mesh is assumed to be a first mesh coarseness, and the coarseness of a coarser mesh is assumed to be a second mesh coarseness) which differ in mesh coarseness (hereinafter, also referred to as a mesh size or an element size, and both are interchangeable with each other) by a finite element method. In the finite element method, a main stress within the corresponding mesh is averaged and output. Therefore, in a case where a portion having a great stress gradient is present within a certain mesh, a main stress which is output as an average value in the first mesh coarseness is larger than a main stress which is output as an average value in the second mesh coarseness in a case of the first mesh coarseness and a case of the second mesh coarseness.

In the invention, analysis is individually performed by the first mesh coarseness and the second mesh coarseness in each portion of a component by using two types of mesh coarsenesses of the first mesh coarseness and the second mesh coarseness. In this case, when a main stress which is output as an average value is different in the case of the first mesh coarseness and the case of the second mesh coarseness, it can be considered that there is a stress gradient within the corresponding mesh. The difference in main stress corresponds to the magnitude of a stress gradient. The degree of risk of breaking becomes higher as the stress gradient increases, and thus it is possible to predict the degree of risk of breaking on the basis of the degree of difference in main stress.

In the invention, a configuration may be adopted such that forming analysis is performed by division based on a predetermined mesh coarseness instead of using two different types of mesh coarsenesses as described above, a main stress for each mesh is obtained using the predetermined mesh coarseness, a coupled mesh is formed by coupling two or more meshes adjacent to each other, a main stress for each coupled mesh is obtained, and a difference value between a main stress in the predetermined mesh coarseness before coupling and a main stress in the coupled mesh is obtained. In this case, it can be considered that a stress gradient is formed in a portion where a main stress which is output as an average value within a mesh using the predetermined mesh coarseness is different from a main stress which is output as an average value within the coupled mesh larger than the mesh using the predetermined mesh coarseness, and it is possible to predict the degree of risk of breaking on the basis of the degree of difference in the value of a main stress because the degree of risk of breaking becomes higher as the stress gradient increases.

In this case, the forming analysis is basically performed only once, and thus it is possible to perform the forming analysis in a shorter period of time and at lower costs.

More specifically, in the invention, a maximum main stress is used as a main stress which is an index value for predicting breaking. Thereby, the prediction of a breaking occurrence portion during the press forming of a metal sheet is realized by numerical value simulation with a high level of accuracy, at low costs, and in a short period of time.

The maximum main stress is calculated in accordance with the following procedures 1 to 4 (see Non-Patent Documents 1 and 2).

Procedure 1: each component of a stress tensor is calculated by a numerical value calculation method such as a finite element method.

Procedure 2: each component of a stress tensor can be expressed as a matrix of 3×3.

Procedure 3: a main stress (three numerical values of σ1, σ2, and σ3) is obtained from each component of a stress tensor. The main stress is a value obtained as an eigenvalue of the stress tensor.

Procedure 4: a main stress having a maximum value, among obtained three main stresses, is treated as a "maximum main stress". For example, in a relationship of σ1>σ2>σ3, σ1 is regarded as the maximum main stress.

As described above, it is extremely difficult to reliably extract a breaking portion in the related art in predicting the occurrence of breaking during forming using a finite element method. In addition, also in the technique disclosed in Patent Document 4 in which analysis results are compared with each other in accordance with different mesh coarsenesses, a quantitative difference between different mesh coarsenesses is decreased even when a geometric deformation amount such as a maximum main strain or a ratio of a reduction in a sheet thickness is set to be an index in a high-strength steel sheet with high tensile strength and small elongation, and thus it is difficult to specify a breaking portion.

For this reason, in the invention, distributions of maximum main stresses in finite element analysis based on different mesh coarsenesses are compared with each other, and the breaking portion is regarded as a breaking portion when a difference therebetween is sufficiently increased. Thereby, it is possible to predict the breaking portion even in a high-strength steel sheet with high tensile strength and small elongation.

Figure 1B:
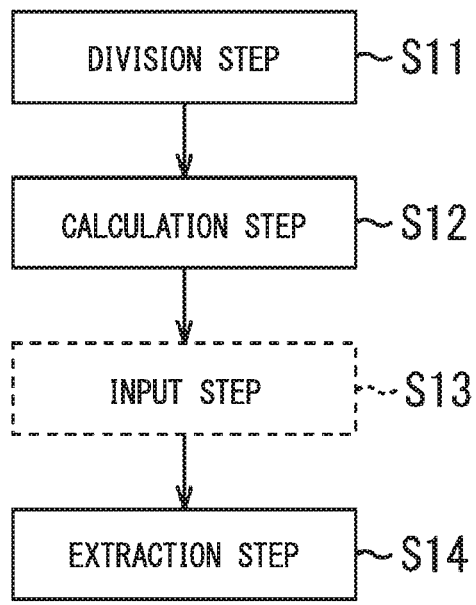
FIG. 1B is a flow chart showing a breaking prediction method of the invention.

In a breaking prediction method of the invention according to an embodiment shown in FIGS. 1A and 1B, when breaking prediction of a component, obtained by forming a metal sheet which is a component to be analyzed, is performed, forming analysis is performed by dividing the component into a first mesh coarseness and a second mesh coarseness coarser than the first mesh coarseness by using a finite element method in a division step S11 using a division unit 11, as shown in FIGS. 1A and 1B. Next, in a calculation step S12 using a calculation unit 12, a maximum main stress is calculated and obtained for each mesh using the first mesh coarseness and the second mesh coarseness. Next, in an extraction step S14 using an extraction unit 14, a difference value between a maximum main stress in a case of the first mesh coarseness and a maximum main stress in a case of the second mesh coarseness is obtained in each portion of the component, and a portion in the case of the first mesh coarseness, which corresponds to a portion having a difference value larger than a predetermined value, is extracted as a breaking portion.

Here, a computer program causes a central processing unit (CPU) of an arithmetic processing device (computer) to execute steps (division step S11, calculation step S12, extraction step S14). In other words, the computer program causes the central processing unit (CPU) of the arithmetic processing device (computer) to function as units (division unit 11, calculation unit 12, and extraction unit 14).

The computer program may be recorded in a computer-readable recording medium, for example, a flexible disk, a CD-R, or the like.

The arithmetic processing device may include an input unit 13 that inputs a maximum main stress obtained for each divided mesh to another computer. As the input unit, a keyboard, a mouse, various digitizers, and the like can be used. In response to this, an input step S13 may be a step of performing input using a keyboard, or may be a step of automatically inputting the maximum main stress calculated in the calculation step S12 to the extraction step 15 (reading data) within the program.

Meanwhile, in FIGS. 1A and 1B and FIGS. 2A and 2B to be described later, a solid line indicates an essential unit or step, and a dashed line indicates a selective unit or step.

First, in the division unit 11 (division step S11), when a component is divided into a plurality of elements (that is, meshes), the component is expressed as digital data (CAD data or shape measurement data) having a three-dimensional component shape in a case of using a solid element (three-dimensional element), or the component is expressed as a set of two-dimensional planar regions in a case of using a shell element (two-dimensional element). At this time, a corner portion of the component has a great variation in the shape thereof, and thus is divided into sufficiently small meshes, thereby securing the reproducibility of the shape. In addition, in a case where breaking at an end portion is analyzed, it is preferable that mesh division is performed so that the outer peripheral line of the component is smoothened without irregularities. In addition, when mesh division is performed on the basis of the first mesh coarseness and the second mesh coarseness which are different coarsenesses, the entire component may be uniformly refined (or roughened), or a location where breaking prediction is performed may be refined or roughened. Since the former method is convenient in terms of the number of steps and the latter method is advantage with respect to a reduction in a calculation time, the methods may be appropriately selected or combined with each other in consideration of the overall load.

Here, in the division unit 11 (division step S11), the first mesh coarseness and the second mesh coarseness are determined on the basis of a relationship with an n value indicating a work hardening property of a component to be analyzed.

In the invention, when analysis is performed through mesh division based on a finite element method, it is necessary to sufficiently finely perform mesh division so as to reproduce a geometric shape of a target portion, that is, for example, the curvature of an end portion, a radius of curvature of a corner portion, and the like. Further, in the invention, when a difference value in maximum main stress between the first mesh coarseness and the second mesh coarseness is obtained after analysis is performed through two types of mesh division of the first mesh coarseness and the second mesh coarseness, it is necessary to give sufficient consideration to the coarsenesses (coarseness and fineness) of two types of mesh division. The inventors wholeheartedly have researched a method of setting the sizes of coarse and fine mesh divisions, and have found that the method is related to a work hardening property of a material. When the work hardening property of the material is represented by an n value generally obtained by a tensile test, it is understood that excellent breaking prediction accuracy is obtained when the average coarseness (second mesh coarseness) L coarse (the unit is mm) of the rough mesh division and the average coarseness (first mesh coarseness) L fine (the unit is mm) of the fine mesh division satisfy the following relationship.

In a case where the solid element is used, it is desirable to determine two types of mesh coarsenesses in parameter ranges respectively represented by the following parameter adjustment expressions of Expressions (1A) and (2A).

$$f(n;k,2.0,0.2) \leq L\ \text{coarse} \leq f(n;k,5.0,2.0) \tag{1A}$$

$$f(n;k,1.5,0.2) \leq L\ \text{fine} \leq f(n;k,2.5,1.5) \tag{2A}$$

On the other hand, in a case where a shell element with high use frequency is used in steel sheet press forming, the mesh size being set to equal to or less than t0 when setting a sheet thickness at the early stage to t0 [mm] causes an increase in an error in calculating a numerical value, and thus it is desirable to use the following expressions (1B) and (2B) in order to avoid the increase in an error.

$$f(n;k,2.0 \times t0,1.5 \times t0) \leq L \text{ coarse} \leq f(n;k,5.0,2.0 \times t0) \quad (1B)$$

$$f(n;k,2.5 \times t0,t0) \leq L \text{ fine} \leq f(n;k,4.0 \times t0,2.5 \times t0) \quad (2B)$$

Here, n is an n value of a material, and a function f(n; k, L, L0) for adjusting the mesh size is obtained as follows.

$$f(n;k,L,L0) = (L-L0) \times (2/\pi) \times \tan^{-1}(k \times n) + L0 \quad (3)$$

Here, L and L0 are the upper limit and the lower limit of the mesh size (mesh coarseness), respectively. A variable k is a parameter for adjusting the rate of variation in the mesh size with respect to the n value, and it is considered that a value in a range of approximately $50 \leq k \leq 100$ is appropriate, as a result of the examination. Hereinafter, a value of k=65 is adopted unless otherwise specified. Values determined as constants are used as three variables of (k, L, L0) in the function f(n; k, L, L0) for specifying the range of the mesh size, and thus the function f in Expression (3) substantially functions as a function for determining the mesh size on the basis of only the n value.

The value of the function f increases together with the n value. In a case where the n value is large, deformation is hardly localized, and thus it is possible to secure breaking prediction accuracy in spite of large mesh division. On the other hand, in a case where the n value is small, deformation is easily localized. Therefore, a deformation gradient of a breaking portion is increased, and thus the breaking prediction accuracy is decreased when sufficiently small mesh division is not performed. In response to this, the function is determined because it is necessary to reduce the size of element division.

Figure 3A:
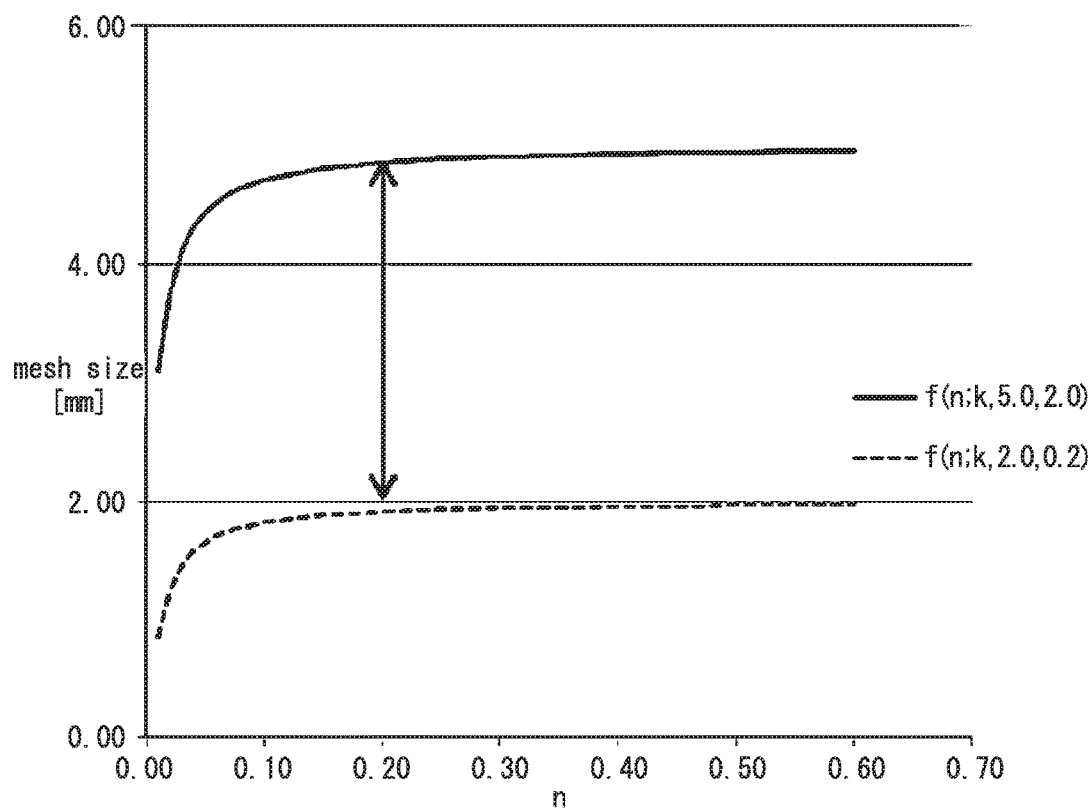
FIG. 3A is a diagram showing an example of a second mesh coarseness (L coarse) in a case of a solid element.
Figure 3B:
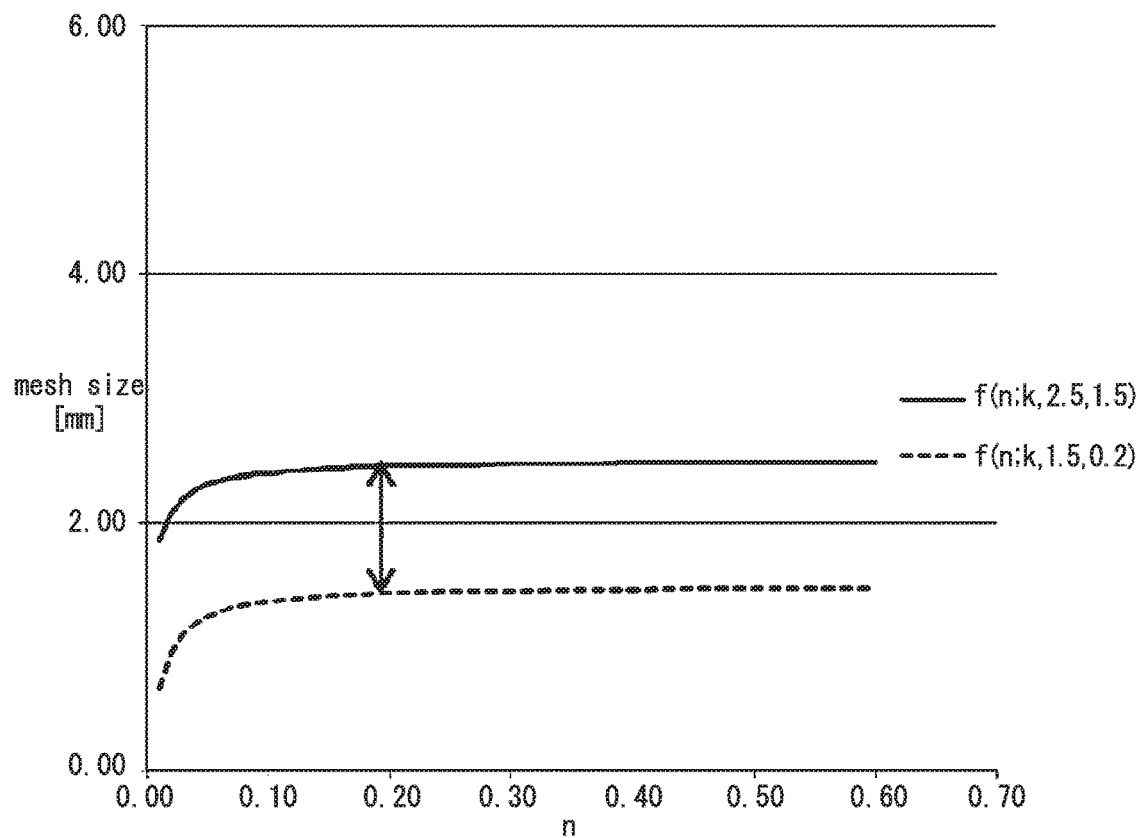
FIG. 3B is a diagram showing an example of a first mesh coarseness (L fine) in a case of a solid element.

FIGS. 3A and 3B show graphs for an n value of the function f and a mesh coarseness in Expressions (1A) and (2A) described above in the case of the solid element. It is necessary to determine L coarse on the basis of a value between a function value of a solid line and a function value of a dotted line in the graph shown in FIG. 3A. For example, in a case where n=0.20, the value of L coarse is determined within a segment range of an arrow. Similarly, it is necessary to determine L fine on the basis of a value between a function value of a solid line and a function value of a dotted line in the graph shown in FIG. 3B. For example, in a case where n=0.20, the value of L fine is determined within a segment range of an arrow.

Further, in order to evaluate a deformation gradient with a high level of accuracy, a ratio L coarse/L fine of L coarse to L fine may be equal to or greater than 1.5, preferably, equal to or greater than 2.

As described above, L coarse (that is, a second mesh coarseness) and L fine (that is, a first mesh coarseness) are set, the accuracy of prediction is not decreased by the coarseness of an excessively coarse mesh. On the other hand, it is possible to obtain excellent accuracy of prediction without increasing the calculation time by using the coarseness of an unnecessarily fine mesh or decreasing the accuracy of prediction.

Next, the division unit 11 (division step S11) performs analysis of a forming step of the entire component by using successive analysis type software such as PAM-STAMP and LS-DYNA or one-step type software such as AutoForm and HyperForm, or the like as software being sold on the market, when forming analysis is performed by a finite element method. Next, the calculation unit 12 (calculation step S12) calculates a maximum main stress for each mesh in each of cases of first mesh coarseness and second mesh coarseness.

Here, with regard to a difference between the above-described maximum main stresses, a mesh of another analysis result (that is, an analysis result based on the second mesh coarseness) which is closest to the position of a mesh to be noticed is extracted on the basis of an analysis result (that is, an analysis result based on the first mesh coarseness) indicating that the coarseness of mesh division is finest, and a difference between the analysis results is calculated.

In the extraction unit 14 (extraction step S14), a mesh in which the above-described difference value between the maximum main stresses is larger than a predetermined value is extracted as a breaking portion.

The above-described calculation (calculation unit 12 (calculation step S12)) and extraction (extraction unit 14 (extraction step S14)) may be executed within the same computer. The extraction (extraction unit 14 (extraction step S14)) may be executed by executing the calculation (calculation unit 12 (calculation step S12)) by one computer and then inputting a maximum main stress for each of two or more types of meshes, in which the coarseness of mesh division which is the analysis result varies, to another computer (input unit 13 (input step S13)).

Here, in a case where the input unit 13 and the extraction unit 15 are configured as devices separate from the division unit 11 and the calculation unit 12, a result of forming analysis performed by one computer is input to another computer as the original data, and thus it is possible to perform processes in parallel and to obtain an effect of improving efficiency.

In the embodiment, in the extraction (extraction unit 14 (extraction step S14)) of a breaking portion, in a case where a breaking portion is not extracted, at least one of resetting at least the first mesh coarseness, out of the first mesh coarseness and the second mesh coarseness, to a finer coarseness and resetting a predetermined value to a smaller value is performed, and then the division and the forming analysis (division unit 11 (division step S11)), the calculation of a maximum main stress for each mesh (calculation unit 12 (calculation step S12)), and the extraction of a breaking portion (extraction unit 14 (extraction step S14)) are sequentially executed again.

At least the first mesh coarseness is reset to a finer coarseness so that the influence of averaging of the maximum main stress in the mesh is reduced, that is, a portion having stress concentrated thereon is actualized. Thereby, a large difference value between the maximum stress based on the first mesh coarseness and the maximum main stress based on the second mesh coarseness is obtained, and thus it is possible to more reliably predict a breaking portion.

On the other hand, in a case where a predetermined value is reset to a smaller value, it is possible to predict, for example, a portion having a difference value in maximum main stress not being so large, as a portion having risk of causing breaking.

In the embodiment, the division unit 11 of FIG. 1A (division step S11 of FIG. 1B) performs forming analysis by dividing end portions of a component to be analyzed into a plurality of meshes, and the extraction unit 14 (extraction step S14) extracts any one end portion as a breaking portion.

In order to divide the end portions of the component into the plurality of meshes, the division is performed so that the coarseness of mesh division reliably varies, particularly, in a portion where breaking prediction is to be performed. The end portions where breaking prediction is to be performed are required to be smoothly connected without irregularities in both a case where mesh division is coarse and a case where mesh division is fine. In addition, in order to reliably perform breaking prediction at the end portion, it is important to evaluate a stress gradient along the end portion, and it is desirable that the coarseness of mesh division reliably varies in a direction along the end portion.

In order to extract any one end portion as a breaking risk portion, a portion of a mesh in which a difference value in maximum main stress for each predetermined mesh is larger than a predetermined value is extracted as the breaking risk portion, similarly to the above-described embodiment.

Figure 2A:
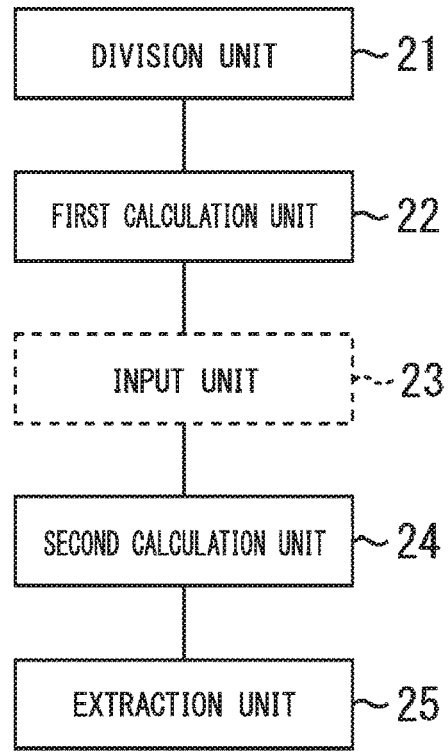
FIG. 2A is a diagram showing a schematic configuration of the arithmetic processing device of the invention.
Figure 2B:
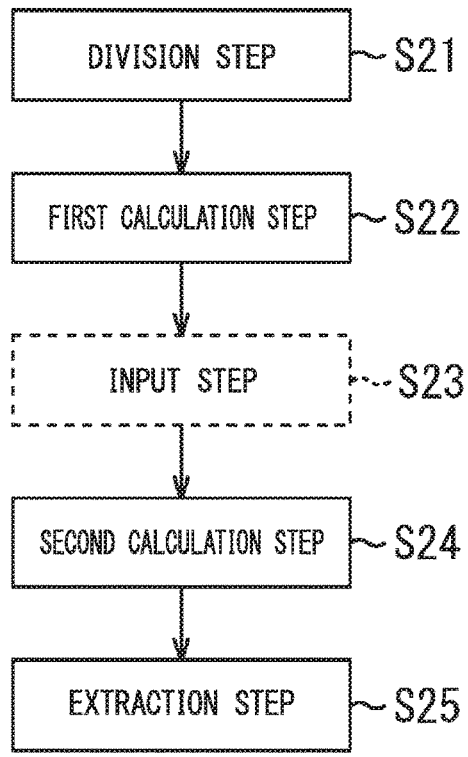
FIG. 2B is a flow chart showing a breaking prediction method of the invention.

In the embodiment shown in FIGS. 2A and 2B, when breaking prediction of a component obtained by forming a metal sheet is performed, forming analysis is performed by dividing the component into predetermined mesh coarsenesses by using a finite element method in a division step S21 by a division unit 21, as shown in FIGS. 2A and 2B. Next, a maximum main stress is calculated and obtained for each mesh in a first calculation step S22 performed by a first calculation unit 22. Next, in a second calculation step S24 performed by a second calculation unit 24, a coupled mesh is formed by coupling two or more meshes adjacent to each other, and a maximum main stress is calculated and obtained for each coupled mesh. Next, in an extraction step S25 performed by an extraction unit 25, a difference value between the maximum main stress obtained by the first calculation unit 22 (first calculation step S22) and the maximum main stress obtained by the second calculation unit 24 (second calculation step S24) is obtained for each portion of the component, and a portion in a case of the first calculation unit 22 (first calculation step S22), which corresponds to a portion in which the difference value is larger than a predetermined value, is extracted as a breaking portion.

Here, similarly to the above-described embodiment, a computer program causes a central processing unit (CPU) of an arithmetic processing device (computer) to execute steps (division step S21, first calculation step S22, second calculation step S24, extraction step S25). In other words, the computer program causes the central processing unit (CPU) of the arithmetic processing device (computer) to function as units (division unit 21, first calculation unit 22, second calculation unit 24, and extraction unit 25).

The computer program may be recorded in a computer-readable recording medium, for example, a flexible disk, a CD-R or the like.

The arithmetic processing device may include an input unit 23 that inputs a maximum main stress obtained for each divided mesh to another computer. As the input unit 23, a keyboard, a mouse, various digitizers, and the like can be used. In response to this, an input step S23 may be a step of performing input using a keyboard, or may be a step of automatically inputting the maximum main stress calculated in the first calculation step S22 to the second calculation step 24 (reading data) within the program.

First, when a component, obtained by forming a metal sheet which is a component to be analyzed, is divided into predetermined meshes (division unit 21 (division step S21)), the component is expressed as digital data (CAD data or shape measurement data) having a three-dimensional component shape in a case of using a solid element, or the component is expressed as a set of two-dimensional planar regions in a case of using a shell element. At this time, a corner portion of the component has a great variation in the shape thereof, and thus is divided into sufficiently small meshes, thereby securing the reproducibility of the shape. In addition, in a case where breaking at an end portion is analyzed, it is preferable that mesh division is performed so that the outer peripheral line of the component is smoothened without irregularities.

Next, the same forming analysis as that in the above-described embodiment is performed using the same software as that in the division (division unit 11 (division step S11)) shown in FIGS. 1A and 1B, analysis of a forming step of the entire component is performed, and the first calculation unit 22 (first calculation step S22) calculates a maximum main stress for each mesh to be noticed. The calculation of the maximum main stress is the same as the calculation (calculation unit 12 (calculation step S12)) in FIGS. 1A and 1B.

Next, in the second calculation unit 24 (second calculation step S24), a calculated value (maximum main stress) in each mesh to be coupled and information on the position (coordinates) of each mesh are required in order to form a coupled mesh by coupling two or more meshes adjacent to each other. A calculated value in the coupled mesh is set to be an arithmetical mean of the calculated value in the respective meshes. The position of the coupled mesh may be set to be an arithmetical mean of positions of the respective meshes. Alternatively, in a more simple manner, the position of a mesh in the center portion may be taken over as it is.

With regard to a difference value between maximum main stresses before and after the coupling of meshes, meshes positioned closest to each other are extracted when comparing before and after the coupling of meshes, and the difference value is calculated as a difference value between maximum main stresses in the respective meshes.

An element in which the above-described difference value between the maximum main stresses before and after the coupling of meshes is larger than a predetermined value is extracted as a breaking portion (extraction unit 25 (extraction step S25)).

A method of obtaining the predetermined value is the same as the extraction (extraction unit 14 (extraction step S14)) in FIGS. 1A and 1B.

The above-described first calculation (first calculation unit 22 (first calculation step S22)) and second calculation (second calculation unit 24 (second calculation step S24)) may be executed within the same computer in succession, or may be executed by executing the first calculation (first calculation unit 22 (first calculation step S22)) by one computer and then inputting a maximum main stress for each mesh which is the analysis result thereof to another computer (input unit 23 (input step S23)), second calculation (second calculation unit 24 (second calculation step S24)), extraction (extraction unit 25 (extraction step S25)).

Here, in a case where the input unit 23, the second calculation unit 24, and the extraction unit 25 are configured as devices separate from the division unit 21 and the first calculation unit 22, a result of forming analysis performed by one computer is input to another computer as the original data, and thus it is possible to perform processes in parallel and to obtain an effect of improving efficiency.

According to the breaking prediction method of the invention, particularly, distributions of maximum main stresses in two different types of mesh coarsenesses are compared with each other, and thus it is possible to estimate a portion of a stretch flange crack of a press-formed article at low costs and in a short period of time also in ultra-high tensile strength steel (for example, a high-strength steel sheet in a tensile strength class of 980 MPa). Hereinafter, this point will be described in detail.

In the method disclosed in Patent Document 4, deformation is concentrated on a portion in which a variation in a ratio of a reduction in a sheet thickness or a maximum main strain depending on a mesh size is remarkable, and thus the portion is regarded as being highly likely to be cracked. In a case where forming of a material, such as an aluminum plate or a soft steel sheet, which has high deformability is targeted, it is possible to predict a portion likely to be cracked also by using this method.

However, elongation is reduced in a kind of steel (for example, a high-strength steel sheet having a tensile strength of equal to or greater than 980 MPa) which particularly has a high tensile strength among high tensile strength steel sheets, thereby leading to even a high stress state in a small amount of deformation. For this reason, it is difficult to specify a portion likely to be cracked with a geometric deformation amount as an index. On the other hand, in a case where a maximum main stress which is a dynamic variation amount is set to be an index, a stress value greatly varies even with a small deformation amount, and thus it is possible to estimate a portion highly likely to be cracked from a stress difference due to a variation in the mesh size.

Making mesh division fine means that the value of a ratio of a reduction in a sheet thickness or a maximum main strain of a strain concentration portion is calculated and evaluated as a value greater than that in a case where mesh division is coarse. Similarly, making mesh division fine also means that the value of a maximum main stress of the stress concentration portion is calculated and evaluated as a great value. From this viewpoint, it is also considered that it is possible to predict a stretch flange crack risk portion even by using an evaluation index of any of the ratio of a reduction in a sheet thickness, the maximum main strain, and the maximum main stress.

However, there are many cases where the accuracy of stress is low in a finite element analysis such as a static explicit method, a dynamic explicit method, and a one-step method as compared to a static implicit method of a course for strictly solving a balanced state of a member in a low-strength material, and thus it cannot be necessarily said that a maximum main stress is appropriate as a crack portion prediction index. In addition, in a dynamic explicit method, there is a disadvantage in that an error also occurs from a balanced state in a relationship where stress as a stress wave is transmitted within a member as an undulatory motion depending on time. From this viewpoint, setting the stress state to be a prediction index of a stretch flange crack portion in the low-strength material has a problem in terms of the accuracy of calculation.

Figure 4:
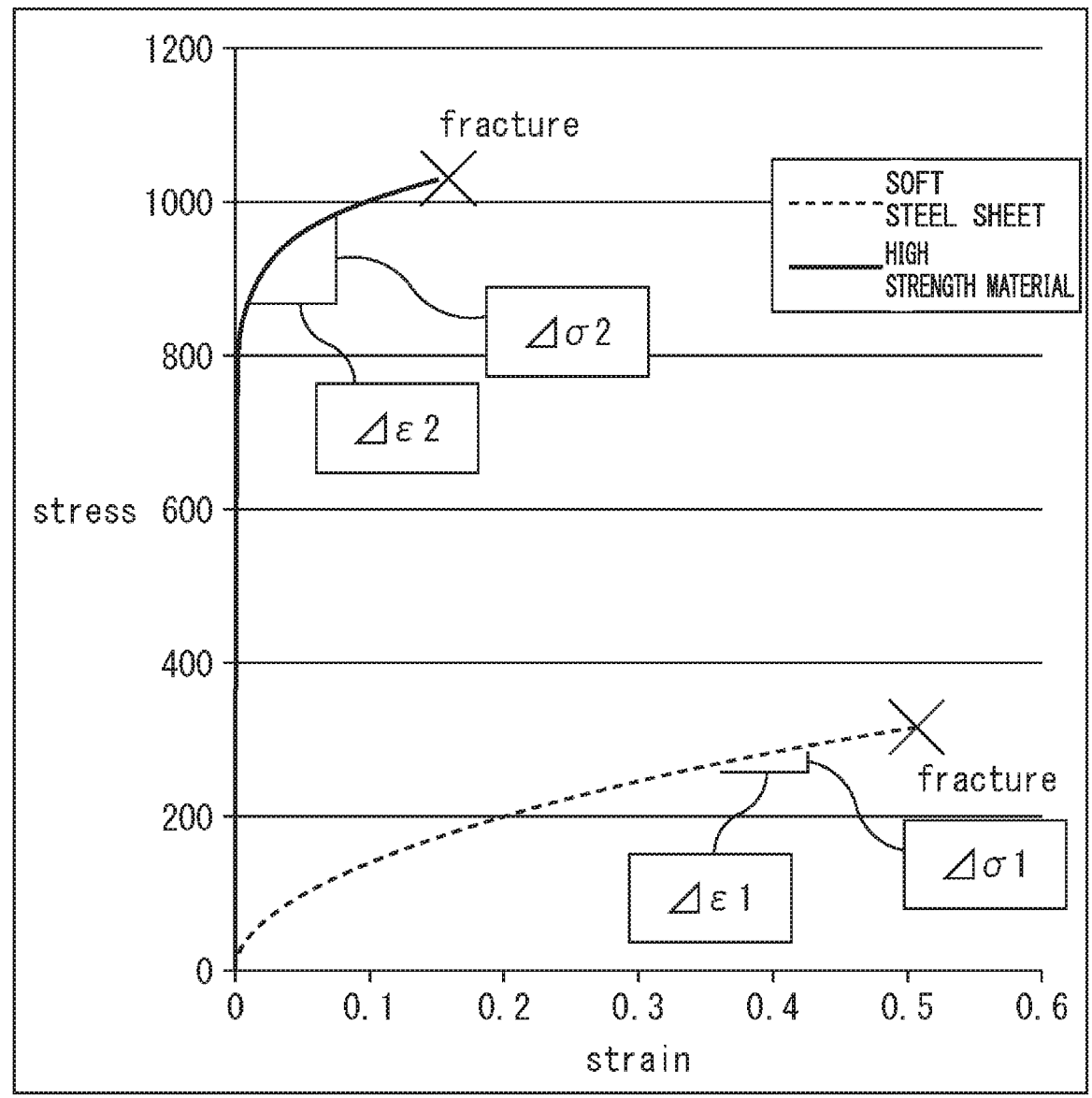
FIG. 4 is a characteristic diagram showing stress-strain curves of a low-strength material (soft steel sheet) and a high-strength material.

In addition, properties of a material to which a stretch flange crack portion prediction technique is to be applied will be first considered. As shown in FIG. 4, in a case of a material, such as a soft steel sheet, which has a low tensile strength and large elongation, it is desired to use a ratio of a reduction in a sheet thickness or a maximum main strain as an index because of a large degree $\Delta\epsilon1$ of variation in a strain value in a case where the size of mesh division is changed. A stress variation amount $\Delta\sigma1$ is decreased in a region having a large deformation amount, and thus the stress variation amount has a problem in being set as an index of crack portion prediction in terms of accuracy.

On the other hand, in a case of an ultra-high strength steel sheet having a high tensile strength and small elongation, a crack portion has to be evaluated in a range in which a variation $\Delta\epsilon2$ in a strain value is small in a case where the size of mesh division is changed. In addition, it is necessary to predict a crack occurrence portion in an extremely small deformation state where an absolute value of strain is also low. However, since the amount of deformation itself is small even when a ratio of a reduction in a sheet thickness or a maximum main strain is set to be an evaluation index in such a case, a difference in the value of an evaluation index between finite element models having different sizes becomes unclear, and thus it is difficult to predict a stretch flange crack portion. On the other hand, the stress variation amount $\Delta\sigma2$ becomes relatively large. For this reason, it is possible to predict a stretch flange crack portion of a material which has a high strength and is hardly formed by adopting a maximum main stress which is a dynamic index as an evaluation index without setting a geometric deformation amount to be an evaluation index.

Figure 5:
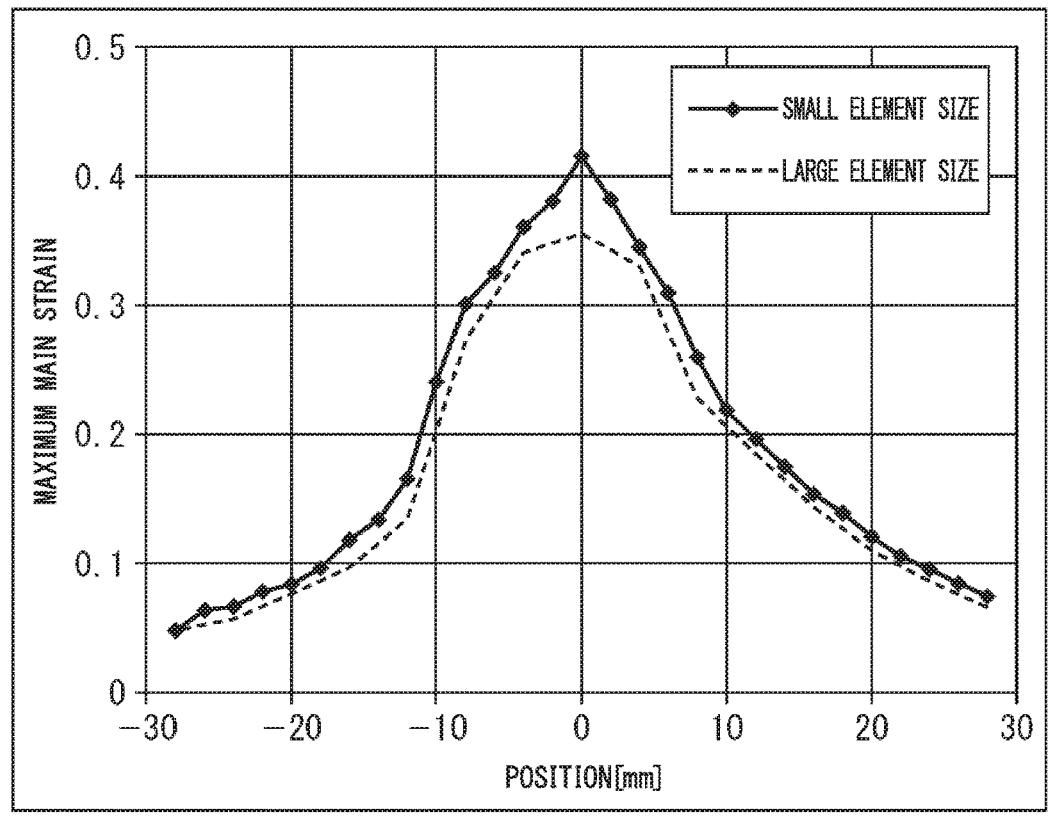
FIG. 5 is a characteristic diagram showing an example of the distribution of a maximum main strain of a low-strength material.

From the viewpoint of a strain distribution and a stress distribution, the superiority of prediction of a stretch flange crack portion in which a difference in maximum main stress is set to be an index with respect to a high-strength material is shown. As shown in FIG. 5, in a case where a maximum main strain distribution of an elongation flange portion of a low-strength material is plotted by two types of mesh coarsenesses (mesh sizes), a great difference in a maximum main strain based on the mesh coarseness is shown in a portion indicating the maximum main strain of the elongation flange portion. From this, it is predicted that a stretch flange crack occurs in the vicinity of a position 0 (mm) by the technique disclosed in Patent Document 4.

Figure 6:
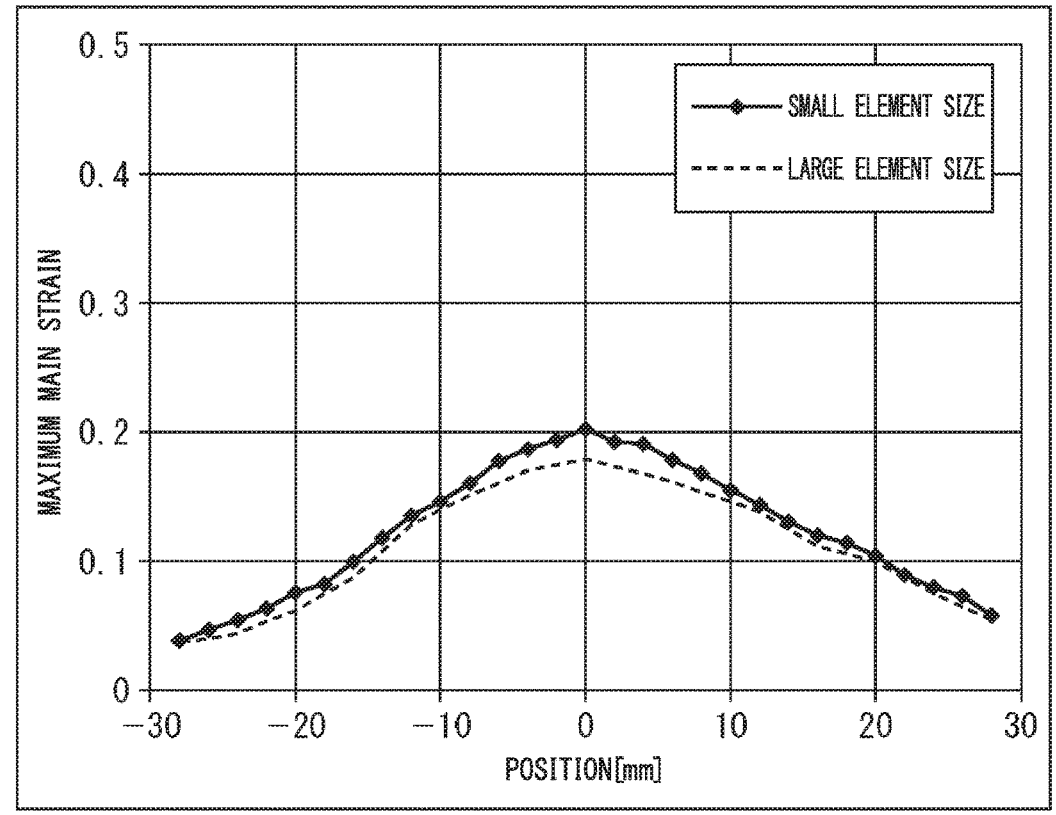
FIG. 6 is a characteristic diagram showing an example of the distribution of a maximum main strain of a high-strength material.

FIG. 6 shows a maximum main strain distribution when finite element analysis is performed on a high-strength material in a tensile strength class of 980 MPa with the same forming shape as in FIG. 5. Although a difference in a maximum main strain is perceived in the vicinity of a position 0 (mm), the difference is quantitatively smaller than that in the example of the low-strength material of FIG. 5. For this reason, it is difficult to set a threshold value $\Delta\epsilon2$ (in FIG. 4) indicating whether or not a stretch flange crack may occur and to predict a crack portion.

Figure 7A:
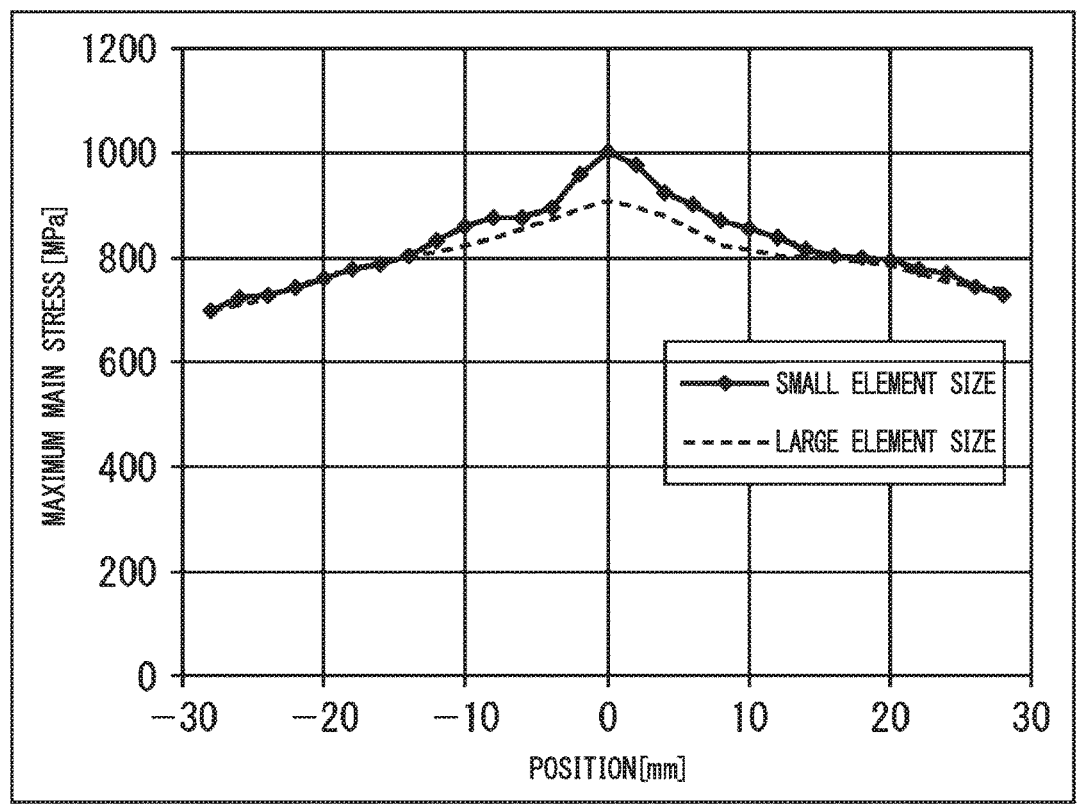
FIG. 7A is a characteristic diagram showing an example of the distribution of a maximum main stress of a high-strength material.
Figure 7B:
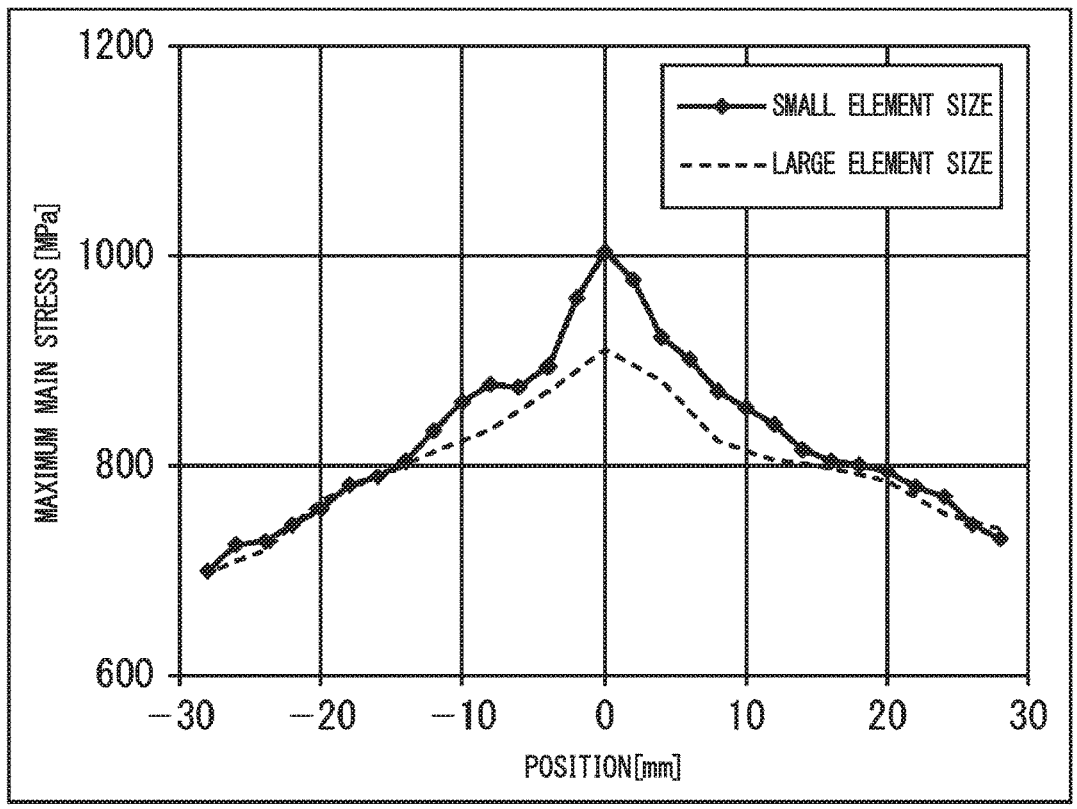
FIG. 7B is an enlarged view of FIG. 7A.

FIG. 7A is a graph obtained by plotting a maximum main stress distribution with respect to a position from an analysis result of FIG. 6. The entire stress level is increased through forming, and a difference in maximum main stress in the vicinity of a position 0 (mm) is small at a glance. However, it can be understood that a difference in a maximum main stress of a peak value is approximately 100 MPa from FIG. 7B which is an enlarged view of the graph. When this degree of difference in maximum main stress is obtained, it is possible to set a threshold value of a stretch flange crack estimation index of a high-strength material at a significant level. In addition, it is apparent that the technique of the invention can be applied also in a method, such as a dynamic explicit method or a one-step method, in which a balanced state of a stress value is not guaranteed.

Also in a finite element analysis method, such as a static explicit method, a dynamic explicit method, or a one-step method, which has low accuracy of calculation of stress as pointed out above, different finite element mesh sizes differ in the degree of concentration of a maximum main stress, and thus it is possible to predict a stretch flange crack of a material which has a high strength and is hardly formed.

As described above, the invention is particularly suitable for the prediction of breaking in a metal sheet which is a material which has a high strength and is hardly formed. Examples of the material which has a high strength and is hardly formed include a high tensile strength steel sheet, for example, an ultra-high tensile strength steel sheet having a tensile strength of equal to or greater than 980 MPa. However, the invention is not necessarily applied to a high tensile strength steel sheet. The invention can also be applied to other high-strength materials, for example, a high-strength aluminum alloy, pure titanium, and titanium alloy, and can also be applied to other high-strength materials such as a composite material (metal/resin composite material, a dissimilar metal composite material), and carbon fiber.

Further, from the above-described consideration, the inventors further have conceived that combining prediction using a difference in a distribution of a maximum main stress and prediction using a difference in a distribution of a ratio of a reduction in a sheet thickness or a maximum main strain may be advantageous.

That is, it is possible to improve reliability of prediction by combining a plurality of predictions.

As described above, contrary to a metal sheet having a high tensile strength and small elongation, in a metal sheet having a low tensile strength and large elongation, the amount of deformation is large, and thus it is desirable to set a geometric deformation amount, such as a ratio of a reduction in a sheet thickness or a maximum main strain, to be an index. In addition, in a metal sheet having a middle tensile strength and elongation between the metal sheet having a high tensile strength and small elongation and the metal sheet having a low tensile strength and large elongation, it is desirable to use both prediction using a maximum main stress and prediction using at least one of a maximum main strain and a ratio of a reduction in a sheet thickness, without using any one of the predictions. That is, it is possible to extract a breaking portion with an excellent accuracy of prediction with respect to various types of metal sheets, such as not only a metal sheet (for example, an ultra-high tensile strength steel sheet having a tensile strength of equal to or greater than 980 MPa) which has a high strength and small elongation and a metal sheet (for example, a soft steel sheet or an aluminum alloy sheet) or which is particularly suitable for prediction using a maximum main strain or a ratio of a reduction in a sheet thickness but also a metal sheet (for example, a high tensile strength steel sheet having a tensile strength of approximately 490 MPa to 780 MP) which has a middle strength therebetween, by combining a plurality of predictions with each other.

Specifically, with regard to the above-described embodiment shown in FIGS. 1A and 1B, a shape index value which is at least one of a maximum main strain and a ratio of a reduction in a sheet thickness is further obtained for each mesh with respect to a case of division based on the first mesh coarseness and a case of division based on the second mesh coarseness in the calculation step S12 (calculation unit 12), a difference value between the shape index value in the case of the first mesh coarseness and the shape index value in the case of the second mesh coarseness is further obtained in each portion of the component in the extraction step S14 (extraction unit S14), and a portion in the case of the first mesh coarseness, which corresponds to a portion satisfying the difference value in shape index value being larger than a predetermined value or a difference value in maximum main stress being larger than the predetermined value or a combination thereof, is extracted as a breaking portion.

Similarly, with regard to the above-described embodiment shown in FIGS. 2A and 2B, a shape index value which is at least one of a maximum main strain and a ratio of a reduction in a sheet thickness is further obtained for each mesh in the first calculation step S22 (first calculation unit 22), a shape index value is further obtained for each coupled mesh in the second calculation step S24 (second calculation unit 24), a difference value between the shape index value obtained in the first calculation step S22 (first calculation unit 22) and the shape index value obtained in the second calculation step S24 (second calculation unit 24) is further obtained for each portion of the component in the extraction step S25 (extraction unit 25), and a portion in the first calculation step S22 (first calculation unit 22), which corresponds to a portion satisfying the difference value in shape index value being larger than a predetermined value or a difference value in maximum main stress being larger than the predetermined value or a combination thereof, is extracted as a breaking portion.

In a case where deformation is concentrated on a specific portion in analysis using a finite element method, the accuracy of strain or stress within an element in which excessive deformation of a mesh occurs in the specific portion or in the vicinity thereof may be decreased, or calculation may be stopped. An adaptive mesh technique may be used as a numerical value analysis method for avoiding such a problem.

Figure 8A:
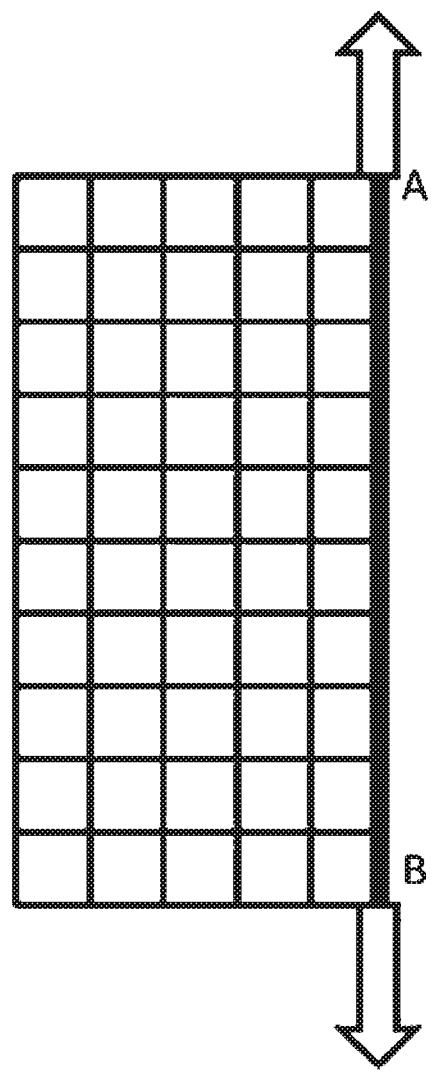
FIG. 8A is a diagram showing an outline of an adaptive mesh.
Figure 8B:
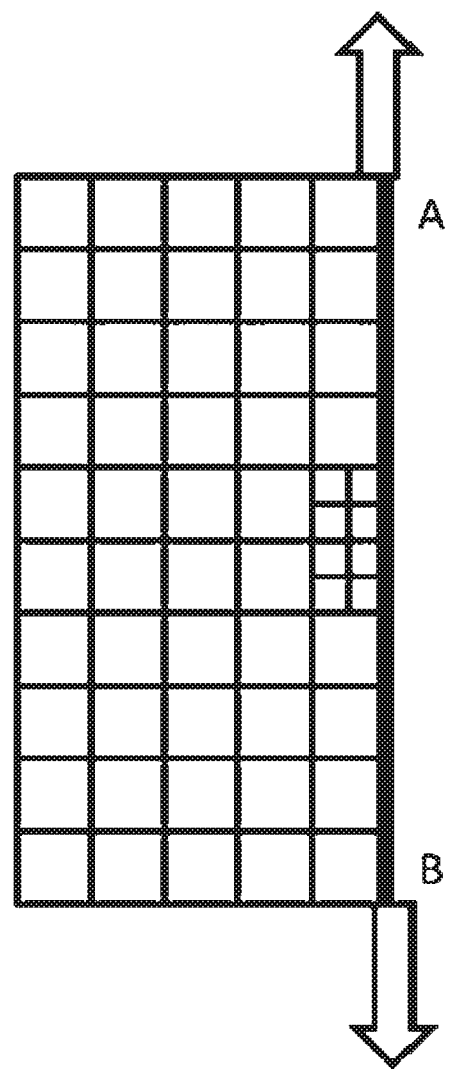
FIG. 8B is a diagram showing an outline of an adaptive mesh.
Figure 8C:
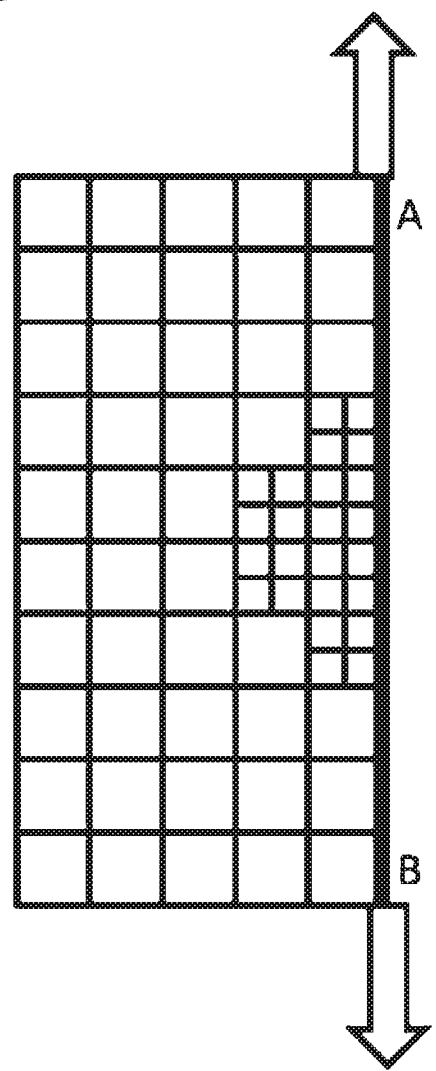
FIG. 8C is a diagram showing an outline of an adaptive mesh.
Figure 8D:
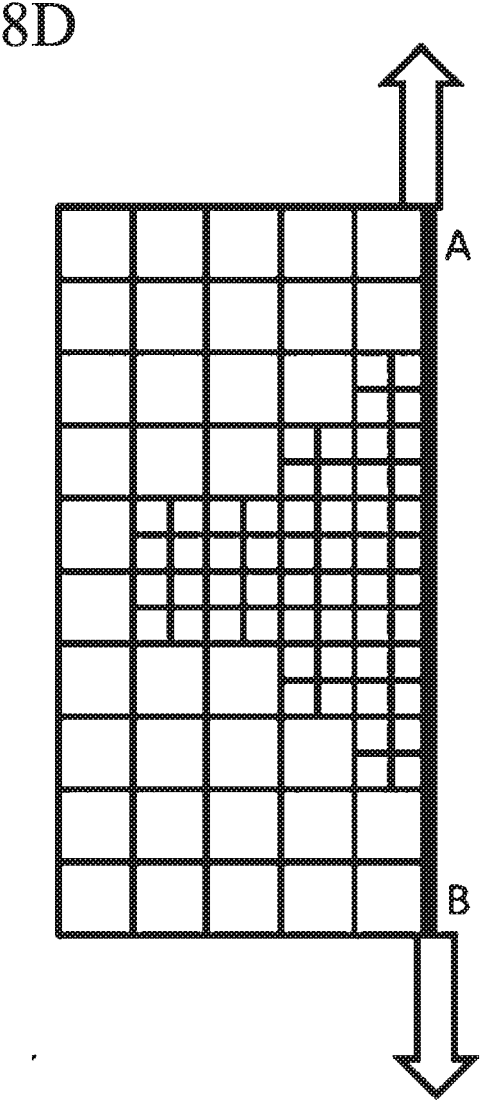
FIG. 8D is a diagram showing an outline of an adaptive mesh.

FIGS. 8A to 8D show an outline of an adaptive mesh. A case is assumed in which a strong stress or strain is generated in the center portion of a segment AB as a result of application of strong tensile deformation to a point A and a point B on a model having a mesh size as shown in FIG. 8A. In this case, when simulation is advanced in a state of the mesh size at the early stage, a case where a finite element model cannot sufficiently express the concentration of a deformation field may occur. As a method for avoiding such a problem, a method of dividing the mesh size of a portion having deformation concentrated thereon so as to reduce the mesh size from the middle of analysis as shown in FIG. 8B is called an adaptive mesh. When the deformation and the concentration of deformation on the specific portion are advanced, a region to which the adaptive mesh is applied is enlarged as shown in FIGS. 8C and 8D. Even when a deformation field is biaxial tensile or compression, the same adaptive mesh can be applied.

Although it is necessary to perform analysis using each of two different types of mesh coarsenesses once in the invention, a great deal of time and analysis cost are required for analysis using a mesh coarseness having a small coarseness in a case where the size and shape complexity of a component to be evaluated are large. In this case, an adaptive mesh is applied to analysis using a mesh coarseness having a large coarseness instead of the analysis using a mesh coarseness having a small coarseness, and thus it is possible to refine only a mesh of a deformation concentration portion which is a target for breaking evaluation. Since a mesh having a small coarseness can be applied to only the deformation concentration portion, it is possible to perform breaking prediction in the invention while avoiding the execution of large-scale analysis.

Specifically, when division based on the first mesh coarseness is performed in the above-described embodiment shown in FIGS. 1A and 1B, an adaptive mesh can be used.

Similarly, also when division based on a predetermined mesh coarseness is performed in the above-described embodiment shown in FIGS. 2A and 2B, an adaptive mesh can be used.

In press forming analysis, a calculation problem, such as a reduction in the accuracy of analysis due to the collapse of a mesh before a bottom dead point, a failure in the determination of a contact between a die and a metal sheet, and a stop in the middle of calculation in a case where the setting of a parameter of a material model is inappropriate, may occur. In these cases, an analysis result is calculated with a low level of accuracy, or a situation such as a midway stop occurs, and thus it is not possible to obtain an appropriate analysis result before comparison between analysis results with mesh sizes having two types of coarsenesses in the invention.

Since it is necessary to obtain analysis results indicating normal completion on the basis of mesh sizes having two types of coarsenesses, the invention cannot be applied in a case where normal termination is not performed in any one or both the analysis models.

It is possible to perform midway stop evaluation and breaking prediction from a stress distribution at a midway stage of forming analysis, rather than necessarily using an analysis result up to the bottom dead point in order to avoid such situations. In addition, in a case where a calculation failure in the bottom dead point is previously assumed, the invention is applied by terminating the analysis at the midway stage in front of the bottom dead point, and thus it is also possible to reduce calculation costs. There are many cases where stress concentration is started in front of the bottom dead point in a portion having a high risk of breaking, and thus it is possible to extract a risk portion through evaluation based on such a midway stop.

Example 1

The invention will be described while taking examples below.

In this example, a stretch flange crack is predicted.

Figure 9:
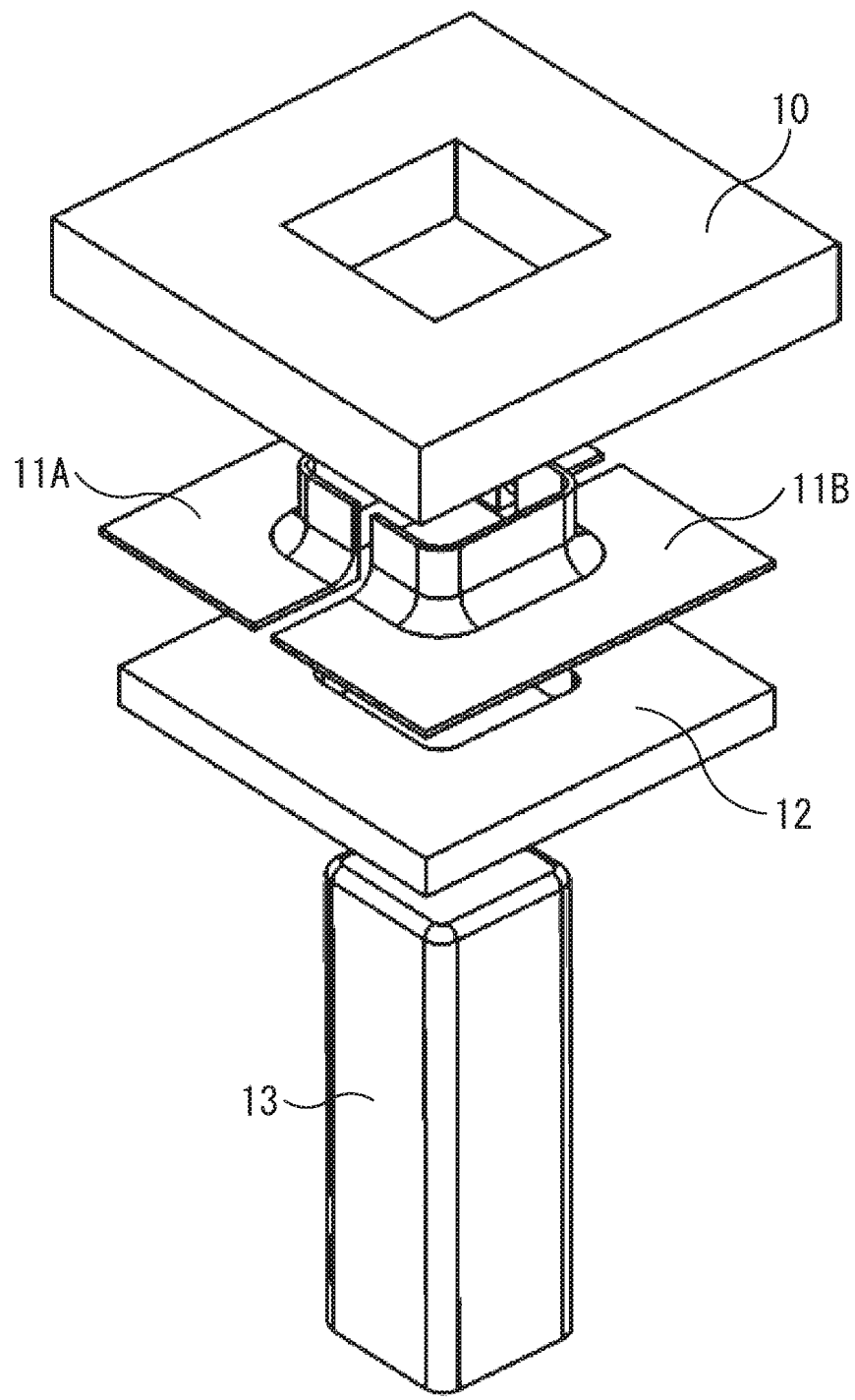
FIG. 9 is a schematic diagram showing a configuration of a die of square cylinder burring forming.

Burring forming by division into two sheets was performed in a die configuration shown in FIG. 9. Square cylinder burring forming was performed by a punch having a square cross section having one side of 40 mm. A radius of a corner of a punch 13 is 5 mm, and a radius of the shoulder portion of the punch is also 5 mm. A die 12 and a plate presser 10 hold raw boards down from above and below to fix the raw board. The raw boards 11A and 11B are obtained by cutting out a square plate of 200 mm×200 mm, punching a rectangular hole in the center portion thereof by laser beam cutting, and cutting a rectangular plate from the center.

Figure 10A:
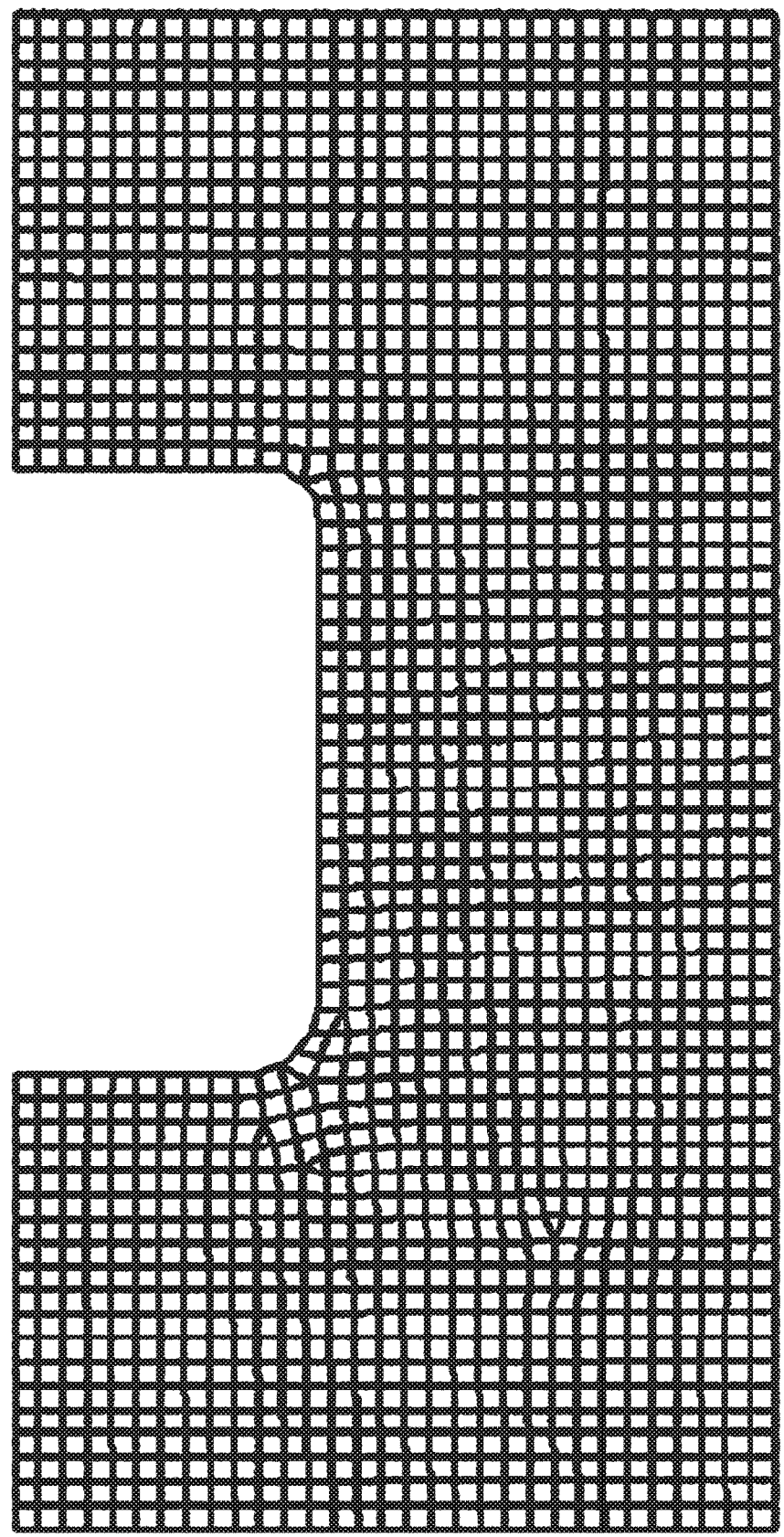
FIG. 10A is a schematic diagram showing a division blank shape in square cylinder burring together with mesh division of a first mesh coarseness (1.6 mm).
Figure 10B:
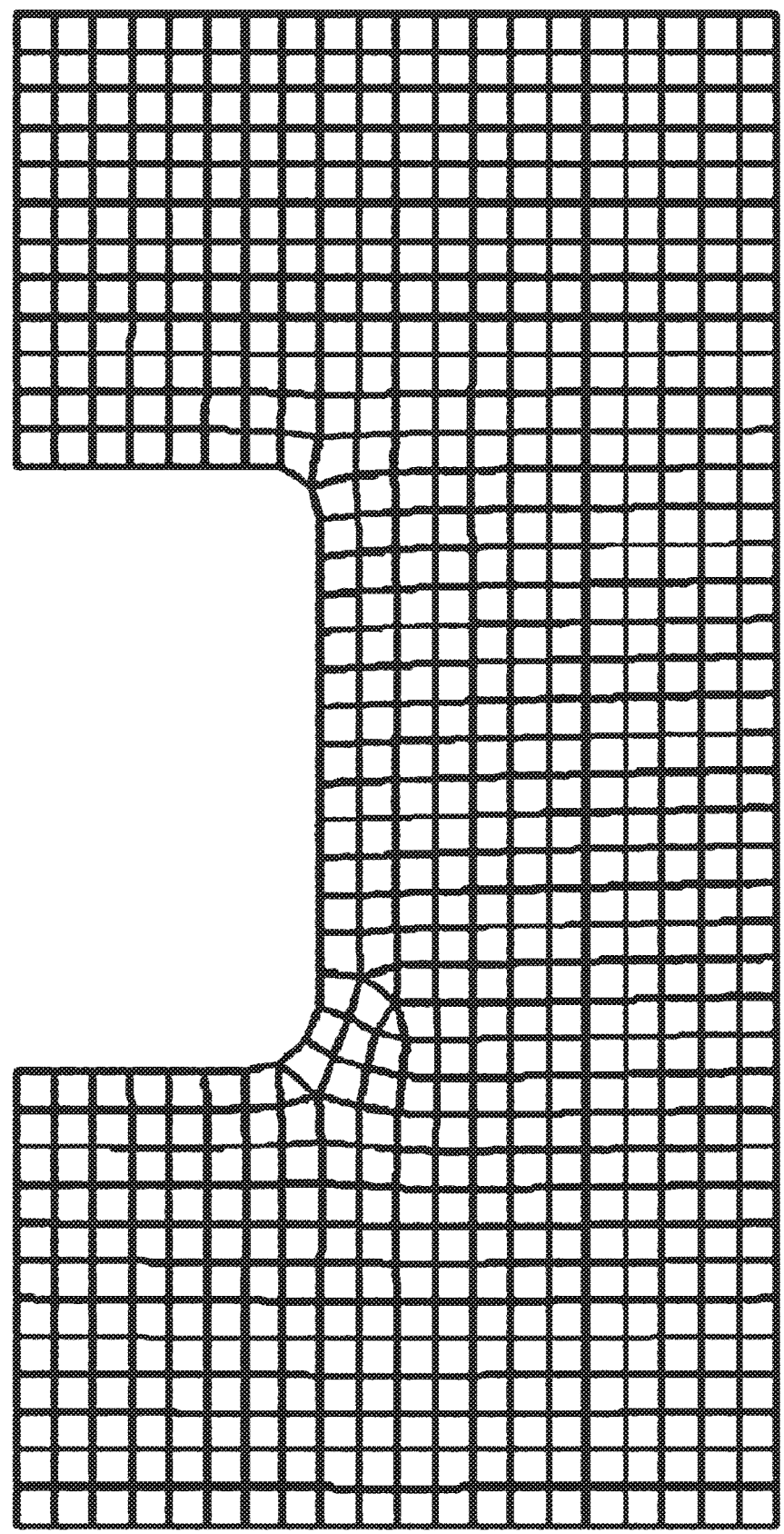
FIG. 10B is a schematic diagram showing a division blank shape in square cylinder burring together with mesh division of a second mesh coarseness (2.5 mm).
Figure 11:
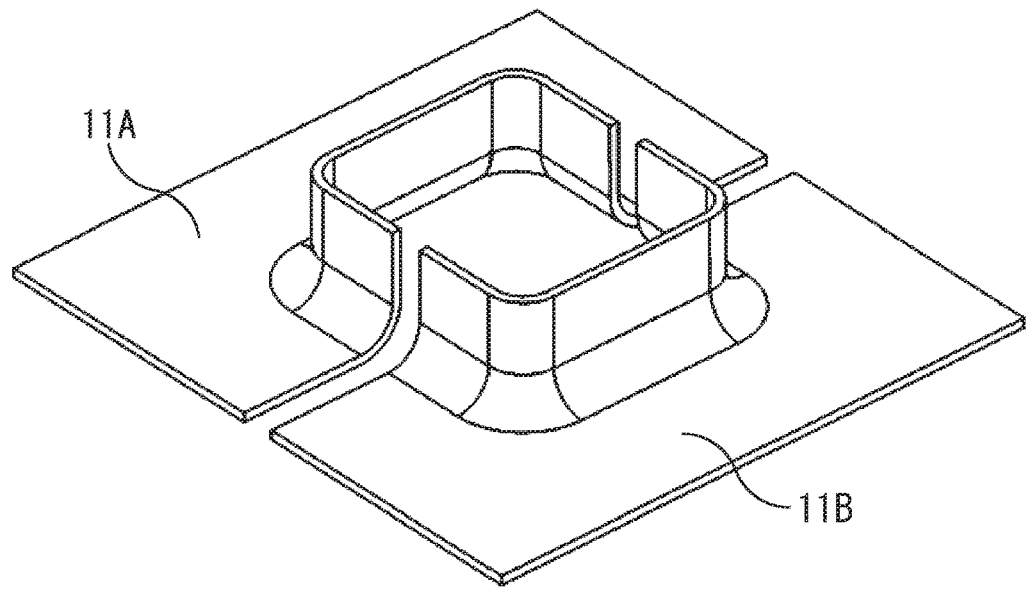
FIG. 11 is a schematic diagram showing a formed product shape of square cylinder burring.

A raw board having a shape as shown in FIGS. 10A and 10B is obtained, and two raw boards are simultaneously subjected to burring forming. Both corners R at two locations are subjected to elongation flange deformation in an experiment, which leads to breaking at any one edge portion. In a case where a crack does not occur, two formed products having a shape as shown in FIG. 11 are obtained.

Two samples having the same shape are simultaneously subjected to burring forming, and thus a corner portion of the rectangular hole is subjected to elongation flange deformation, thereby leading to a possibility of an edge crack. Meanwhile, since a straight side portion of the rectangular hole is a bent flange and tensile deformation to a marginal portion does not occur, there is no concern for a crack.

A test was performed in which a burring height was changed by setting a case where a radius of curvature R=5 mm of the corner of the raw board shown in FIGS. 10A and 10B to be a basic shape and setting three levels of R=3 mm, R=5 mm, and R=7 mm. Square cylinder burring forming was performed on a material (A material) having a sheet thickness of 1.6 mm and a tensile strength of 980 MPa.

When an initial dimension of the rectangular hole was 24 mm×12 mm (forming condition equivalent to a burring height of approximately 8 mm), a crack occurred at the corner portion of R=3 mm. A crack did not occur at the corner of R=5 mm and R=7 mm of the same sample.

A finite element analysis was performed using two types of mesh coarsenesses by the above-described punch and shape of the raw board. As software, a shell element was used by a dynamic explicit method solver in LS-DYNA. Two types of mesh coarsenesses of 1.6 mm (see FIG. 10A) and 2.5 mm (see FIG. 10B) was adopted, and deformation states at the edge portion were compared with each other. The result is shown in Table 1.

TABLE 1

| Corner R of Rectangular Hole | Evaluation Based on Difference in Ratio of Reduction in sheet thickness | Evaluation Based on Difference in Maximum Main Strain | Evaluation Based on Difference in Maximum Main Stress |
| --- | --- | --- | --- |
| 3 mm | No crack | No crack | Occurrence of crack |
| 5 mm | No crack | No crack | No crack |
| 7 mm | No crack | No crack | No crack |

It is possible to predict a crack at the corner of R=3 mm in only the difference in the maximum main stress presented in the invention. Although the concentration of deformation at the elongation flange portion is perceived even by an index of the ratio of a reduction in a sheet thickness or the maximum main strain adopted in Patent Document 4, it is evaluated whether or not a crack occurs at a stage with a burring height of 8 mm and a small deformation amount, and thus it is shown that an evaluation index depending on a geometric deformation amount is not appropriate for the prediction of a crack portion of a high-strength material.

Other Embodiments to which the Invention is Applied

As described above, the breaking prediction method (the division step S11 to the extraction step S14 in FIG. 1B and the division step S21 to the extraction step S25 in FIG. 2B, and the like) of the invention can be realized by a program stored in a RAM, a ROM, or the like of an arithmetic processing device (computer). The program is recorded in a computer-readable storage medium. Hereinafter, the program, the computer-readable recording medium, and the arithmetic processing device (computer) will be more specifically described.

The program is recorded in a recording medium such as a CD-ROM, or is provided to a computer through various transmission mediums. As the recording medium recording the program, a flexible disk, a hard disk, a magnetic tape, a magneto-optical disk, a nonvolatile memory card, or the like can be used, in addition to a CD-ROM. On the other hand, as the transmission medium of the program, a communication medium in a computer network system for propagating program information as a carrier wave and supplying the program information can be used. Here, the computer network refers to a LAN, a WAN, such as the Internet, a wireless communication network, or the like, and the communication medium refers to a wired line such as optical fiber, a wireless line, or the like.

In addition, the program included in the invention is not only a supplied program being executed by a computer so as to realize the functions of the above-described embodiment. For example, even when the functions of the above-described embodiment are realized in cooperation with an operating system (OS) operated by the program in the computer, another application software, or the like, such a program is included in the invention. In addition, even when some or all of the processes of the supplied program are performed by a function extension board or a function extension unit of the computer so that the functions of the above-described embodiment are realized, such a program is included in the invention.

Figure 12:
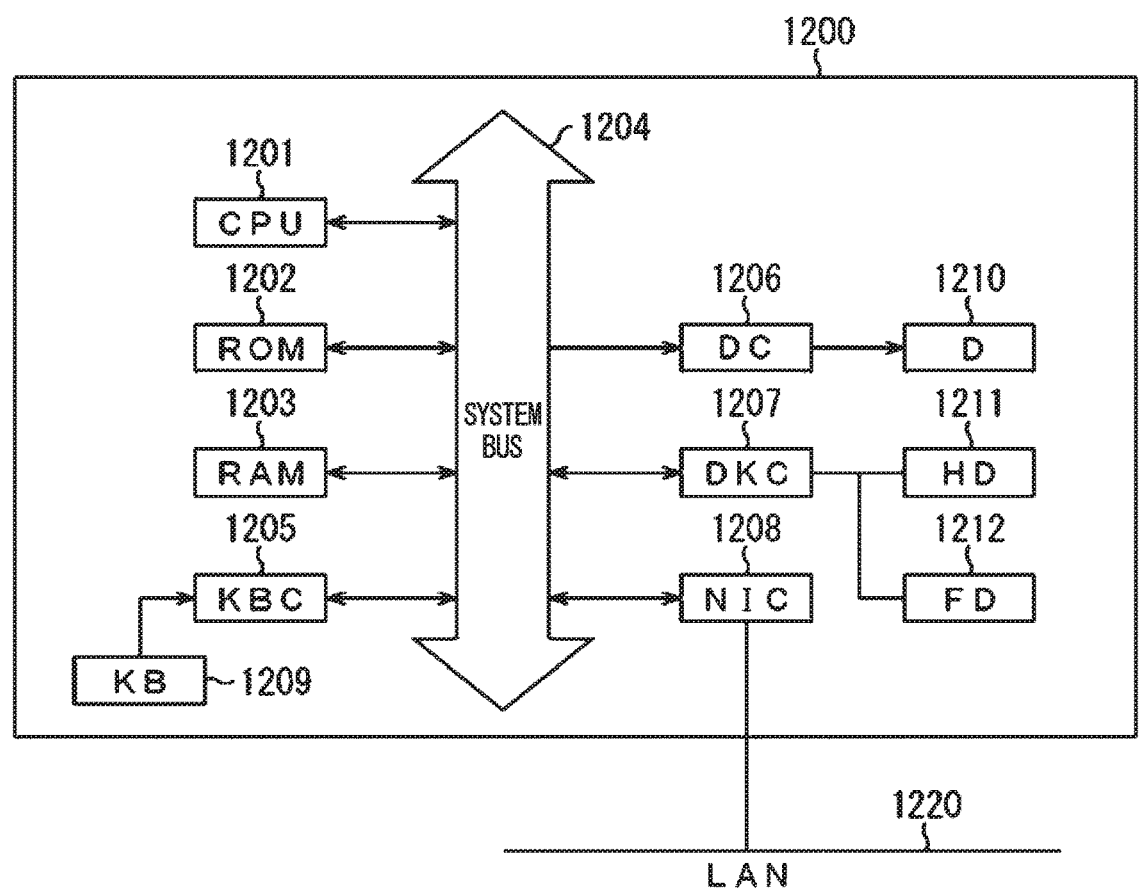
FIG. 12 is a schematic diagram showing an internal configuration of a personal user terminal device.

For example, FIG. 12 is a schematic diagram showing an internal configuration of an arithmetic processing device (personal user terminal device). In FIG. 12, 1200 denotes a personal computer (PC) including a CPU 1201. PC 1200 executes a device control software which is stored in a ROM 1202 or a hard disk (HD) 1211 or which is supplied from a flexible disk drive (FD) 1212. The PC 1200 generally controls devices connected to a system bus 1204.

The procedures of the division step S11 to the extraction step S14 in FIG. 1B, of this embodiment the division step S21 to the extraction step S25 in FIG. 2B, and the like are realized by programs stored in the CPU 1201, the ROM 1202, or the hard disk (HD) 1211 of the PC 1200.

Reference numeral 1203 denotes a RAM which functions as a main memory of the CPU 1201, a work area, and the like. Reference numeral 1205 denotes a keyboard controller (KBC) which controls the input of an instruction received from a keyboard (KB) 1209, a device not shown in the drawing, or the like.

Reference numeral 1206 denotes a disk play controller (DC) which controls a display operation of a display (D) 1210. Reference numeral 1207 denotes a disk controller (DKC). The DKC 1207 controls the access of the hard disk (HD) 1211 and the flexible disk (FD) 1212 which stores a boot program, a plurality of applications, an editing file, a user file, a network management program, and the like. Here, the boot program refers to a startup program which is a program for starting the execution (operation) of hardware or software of a personal computer.

Reference numeral 1208 refers to a network interface card (NIC) for bidirectionally exchanging data with a network printer, another network device, or another PC through a LAN 1220.

BRIEF DESCRIPTION OF THE REFERENCE SYMBOLS 11, 21: DIVISION UNIT
12: CALCULATION UNIT
13, 23: INPUT UNIT
14, 25: EXTRACTION UNIT
22: FIRST CALCULATION UNIT
24: SECOND CALCULATION UNIT

The invention claimed is:

1. A breaking prediction method of predicting a breaking portion of a flange crack of a component obtained by press forming a metal sheet having a tensile strength of equal to or greater than 980 MPa, the method comprising:
determining a first mesh coarseness and a second mesh coarseness on the basis of an n value indicating a work hardening property of the metal sheet, when dividing the component into a plurality of meshes;
performing forming analysis by using a finite element method in each of a case where the metal sheet is divided on the basis of the first mesh coarseness and a case where the metal sheet is divided on the basis of the second mesh coarseness which is coarser than the first mesh coarseness;
obtaining a maximum main stress for each mesh in each of the case of the first mesh coarseness and the case of the second mesh coarseness;
obtaining a difference value of the maximum main stress between the maximum main stress in the case of the first mesh coarseness and the maximum main stress in the case of the second mesh coarseness in each portion of the component, and extracting a portion in the case of the first mesh coarseness, which corresponds to a portion in which the difference value is larger than 100 MPa, as the breaking portion;
setting forming conditions based on the breaking portion that has been extracted; and
press forming the metal sheet using the forming conditions,
wherein an average mesh size of a first mesh L-fine and an average mesh size of a second mesh L-coarse satisfy the following expressions (1B) and (2B):

$$f(n;k,2.0 \times t0,1.5 \times t0) \leq L \text{ coarse} \leq f(n;k,5.0,2.0 \times t0) \quad (1B), \text{ and}$$

$$f(n;k,2.5 \times t0,t0) \leq L \text{ fine} \leq f(n;k,4.0 \times t0,2.5 \times t0) \quad (2B),$$

where t0 is a sheet thickness at an early stage, k is a parameter for adjusting a rate of variation in a mesh size with respect to the n value, a value of a function f(n; k, L, L0) is given by $(L-L0) \times (2/\pi) \times \tan^{-1}(k \times n) + L0$, and L and L0 are an upper limit and a lower limit of the mesh size, respectively.

2. The breaking prediction method according to claim 1, wherein in a case where the breaking portion is not extracted by obtaining the difference value of the maximum stress, steps of the forming analysis, obtaining the maximum main stress for the each mesh, and obtaining the difference value of the maximum main stress, are performed again after resetting at least the first mesh coarseness, out of the first mesh coarseness and the second mesh coarseness, to a coarseness coarser than at least the first mesh coarseness or resetting 100 MPa to a smaller value, or a combination thereof.

3. The breaking prediction method according to claim 1, wherein an adaptive mesh is used when division based on the first mesh coarseness is performed.

4. The breaking prediction method according to claim 1, wherein the forming analysis is terminated in the middle of forming of the component.

5. The breaking prediction method according to claim 1, wherein the method further includes;
obtaining a shape index value, which is at least one of a maximum main strain and a ratio of a reduction in a sheet thickness, for each mesh with respect to a case of division based on the first mesh coarseness and a case of division based on the second mesh coarseness; and
obtaining a difference value of the shape index between the shape index value in the case of the first mesh coarseness and the shape index value in the case of the second mesh coarseness in the each portion of the component,
wherein the portion in the case of the first mesh coarseness, which corresponds to a portion satisfying the difference value in the shape index value being larger than a predetermined value, or the difference value in the maximum main stress being larger than 100 MPa, or a combination thereof, is extracted as the breaking portion.

6. The breaking prediction method according to claim 1, wherein an occurrence portion of a stretch flange crack is predicted as the breaking portion.

7. The breaking prediction method according to claim 1, wherein the breaking portion at an end portion of the component is extracted.

8. The breaking prediction method according to claim 1, wherein a ratio of the first mesh coarseness to the second mesh coarseness is equal to or greater than 1.5.

\* \* \* \* \*